United States Patent
Podaima et al.

(10) Patent No.: US 10,037,280 B2
(45) Date of Patent: Jul. 31, 2018

(54) SPECULATIVE PRE-FETCH OF TRANSLATIONS FOR A MEMORY MANAGEMENT UNIT (MMU)

(71) Applicant: QUALCOMM Incorporated, San Diego, CA (US)

(72) Inventors: Jason Edward Podaima, Toronto (CA); Paul Christopher John Wiercienski, Toronto (CA); Kyle John Ernewein, Toronto (CA); Carlos Javier Moreira, Markham (CA); Meghal Varia, Brampton (CA); Serag Gadelrab, Markham (CA); Muhammad Umar Choudry, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 476 days.

(21) Appl. No.: 14/726,454

(22) Filed: May 29, 2015

(65) Prior Publication Data

US 2016/0350225 A1 Dec. 1, 2016

(51) Int. Cl.
*G06F 12/08* (2016.01)
*G06F 12/10* (2016.01)
(Continued)

(52) U.S. Cl.
CPC .......... *G06F 12/0862* (2013.01); *G06F 12/10* (2013.01); *G06F 12/109* (2013.01);
(Continued)

(58) Field of Classification Search
CPC .... G06F 12/0862; G06F 12/10; G06F 12/109; G06F 12/1036; G06F 2212/6026; G06F 2212/654
See application file for complete search history.

(56) References Cited

U.S. PATENT DOCUMENTS 8,185,696 B2  5/2012  Vuletic et al.
8,341,357 B2  12/2012  Karlsson et al.
(Continued)

OTHER PUBLICATIONS

International Search Report and Written Opinion—PCT/US2016/030435—ISA/EPO—dated Jul. 28, 2016.

*Primary Examiner* — Hal Schnee
*Assistant Examiner* — Nicholas A. Paperno
(74) *Attorney, Agent, or Firm* — Muncy, Geissler, Olds & Lowe, P.C.

(57) ABSTRACT

Systems and methods for pre-fetching address translations in a memory management unit (MMU) are disclosed. The MMU detects a triggering condition related to one or more translation caches associated with the MMU, the triggering condition associated with a trigger address, generates a sequence descriptor describing a sequence of address translations to pre-fetch into the one or more translation caches, the sequence of address translations comprising a plurality of address translations corresponding to a plurality of address ranges adjacent to an address range containing the trigger address, and issues an address translation request to the one or more translation caches for each of the plurality of address translations, wherein the one or more translation caches pre-fetch at least one address translation of the plurality of address translations into the one or more translation caches when the at least one address translation is not present in the one or more translation caches.

28 Claims, 14 Drawing Sheets

(51) Int. Cl.
*G06F 12/0862* (2016.01)
*G06F 12/109* (2016.01)

(52) U.S. Cl.
CPC ........... *G06F 2212/1021* (2013.01); *G06F 2212/283* (2013.01); *G06F 2212/312* (2013.01); *G06F 2212/507* (2013.01); *G06F 2212/608* (2013.01); *G06F 2212/6026* (2013.01); *G06F 2212/65* (2013.01); *G06F 2212/654* (2013.01)

(56) References Cited

U.S. PATENT DOCUMENTS

| | | |
|---|---|---|
| 8,397,049 B2 | 3/2013 | Wang et al. |
| 9,092,358 B2 * | 7/2015 | Rychlik .............. G06F 12/1027 |
| 2005/0198439 A1 | 9/2005 | Lange et al. |
| 2012/0072702 A1 * | 3/2012 | Pierson .............. G06F 12/0862 |
| | | 712/207 |
| 2012/0151156 A1 | 6/2012 | Citron et al. |
| 2012/0226888 A1 * | 9/2012 | Rychlik .............. G06F 12/1027 |
| | | 711/207 |
| 2013/0013867 A1 * | 1/2013 | Manne ................ G06F 12/0862 |
| | | 711/137 |
| 2013/0185515 A1 | 7/2013 | Sassone et al. |
| 2013/0339650 A1 * | 12/2013 | Alexander .......... G06F 12/0862 |
| | | 711/205 |
| 2014/0052956 A1 | 2/2014 | Moll |
| 2014/0281351 A1 | 9/2014 | Topp et al. |
| 2016/0173451 A1 * | 6/2016 | Banville ............ H04L 63/1458 |
| | | 726/13 |

* cited by examiner

SPECULATIVE PRE-FETCH OF TRANSLATIONS FOR A MEMORY MANAGEMENT UNIT (MMU)

TECHNICAL FIELD

Embodiments of the disclosure are related to speculative pre-fetch of translations for a memory management unit (MMU).

BACKGROUND

System-on-a-chip (SoC) devices may include one or more central processors, one or more interconnects (or buses), one or more peripheral devices (or upstream devices), and one or more slave devices. Such SoC devices may further include a memory management unit (MMU) coupled to the processor and one or more system MMUs (SMMUs) coupled to the one or more peripheral devices. An SMMU provides address translation services for peripheral device traffic in much the same way that a processor's MMU translates addresses for processor memory accesses.

The main functions of an MMU include address translation, memory protection, and attribute control. Address translation is the translation of an input address to an output address. Translation information is stored in translation tables that the MMU references to perform address translation. An MMU can store completed translations in a translation cache to avoid accessing the translation tables the next time an input address to the same block of memory is received.

Demand misses in the MMU translation cache negatively impact system performance and system costs by causing, for example, increased memory latency (delays), reduced bandwidth utilization, and increased buffering to hide the delays. Present solutions to minimize the number of such demand misses include attempting to "predict" what translations are required in the future and put them in the translation cache. Specifically, these solutions predict that previously used and nearby translations will be required in the future. In order for such prediction schemes to perform well a high degree of temporal/spatial locality is required. In cases where there is limited spatial/temporal locality, the predictions are often incorrect and as a result the prediction schemes perform poorly.

SUMMARY

The following presents a simplified summary relating to one or more aspects and/or embodiments associated with the mechanisms disclosed herein for speculative pre-fetch of translations for a memory management unit (MMU). As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

A method of pre-fetching address translations in an MMU of a device includes detecting a triggering condition related to one or more translation caches associated with the MMU, the triggering condition associated with a trigger address, generating a sequence descriptor describing a sequence of address translations to pre-fetch into the one or more translation caches, wherein the sequence of address translations comprises a plurality of address translations corresponding to a plurality of address ranges adjacent to an address range containing the trigger address, and issuing an address translation request to the one or more translation caches for each of the plurality of address translations in the sequence of address translations, wherein the one or more translation caches pre-fetch at least one address translation of the plurality of address translations into the one or more translation caches based on the at least one address translation not being present in the one or more translation caches.

An apparatus for pre-fetching address translations in an MMU of a device includes logic configured to detect a triggering condition related to one or more translation caches associated with the MMU, the triggering condition associated with a trigger address, logic configured to generate a sequence descriptor describing a sequence of address translations to pre-fetch into the one or more translation caches, wherein the sequence of address translations comprises a plurality of address translations corresponding to a plurality of address ranges adjacent to an address range containing the trigger address, and logic configured to issue an address translation request to the one or more translation caches for each of the plurality of address translations in the sequence of address translations, wherein the one or more translation caches pre-fetch at least one address translation of the plurality of address translations into the one or more translation caches based on the at least one address translation not being present in the one or more translation caches.

An apparatus of pre-fetching address translations in an MMU of a device includes means for detecting a triggering condition related to one or more translation caches associated with the MMU, the triggering condition associated with a trigger address, means for generating a sequence descriptor describing a sequence of address translations to pre-fetch into the one or more translation caches, wherein the sequence of address translations comprises a plurality of address translations corresponding to a plurality of address ranges adjacent to an address range containing the trigger address, and means for issuing an address translation request to the one or more translation caches for each of the plurality of address translations in the sequence of address translations, wherein the one or more translation caches pre-fetch at least one address translation of the plurality of address translations into the one or more translation caches based on the at least one address translation not being present in the one or more translation caches.

A non-transitory computer-readable medium for pre-fetching address translations in an MMU of a device includes at least one instruction to detect a triggering condition related to one or more translation caches associated with the MMU, the triggering condition associated with a trigger address, at least one instruction to generate a sequence descriptor describing a sequence of address translations to pre-fetch into the one or more translation caches, wherein the sequence of address translations comprises a plurality of address translations corresponding to a plurality of address ranges adjacent to an address range containing the trigger address, and at least one instruction to issue an address translation request to the one or more translation caches for each of the plurality of address translations in the sequence of address translations, wherein the one or more translation caches pre-fetch at least one address translation of the plurality of address translations into the one or more translation caches based on the at least one address translation not being present in the one or more translation caches.

Other objects and advantages associated with the mechanisms disclosed herein will be apparent to those skilled in the art based on the accompanying drawings and detailed description.

BRIEF DESCRIPTION OF THE DRAWINGS

A more complete appreciation of embodiments of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
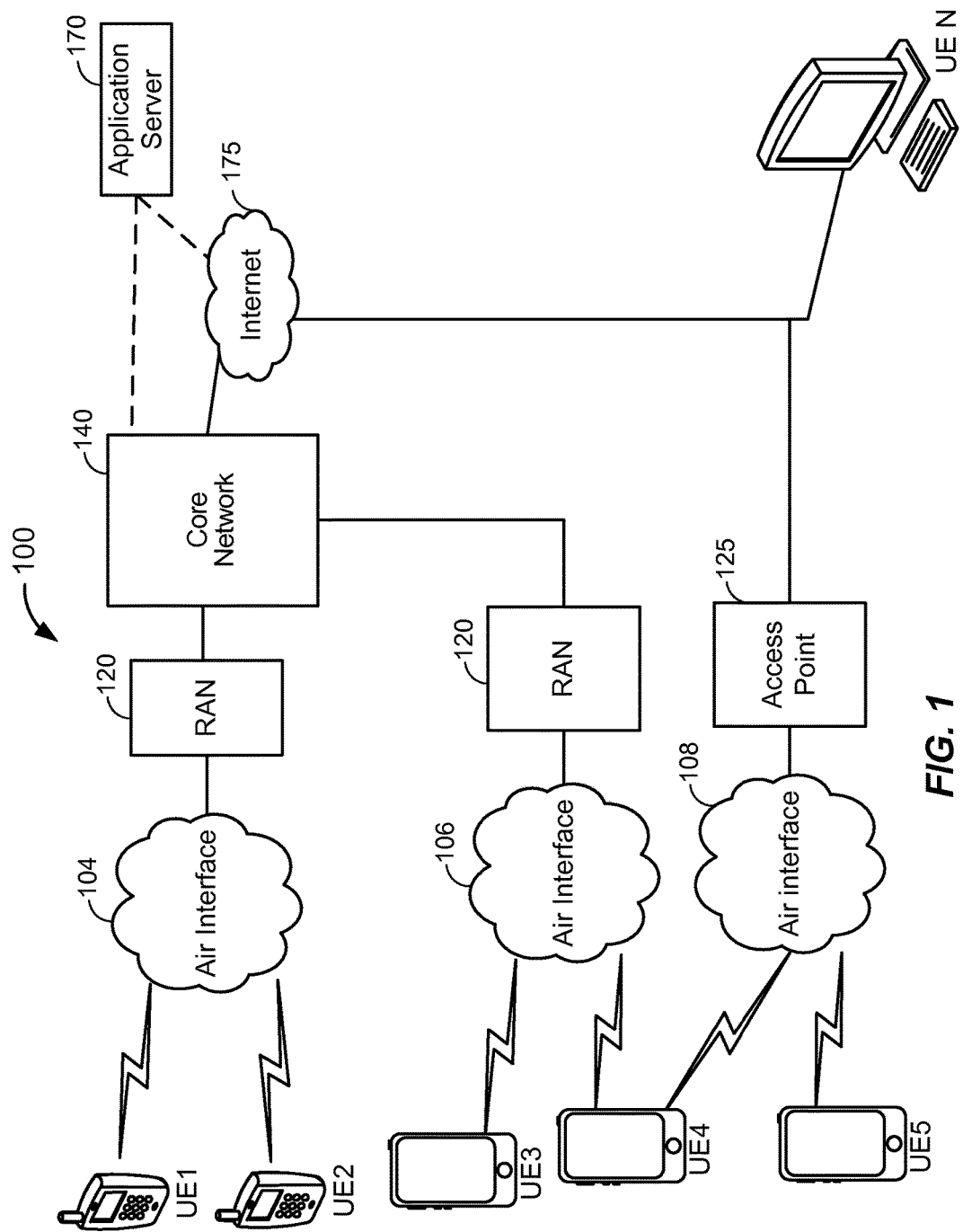
FIG. 1 illustrates a high-level system architecture of a wireless communications system in accordance with an embodiment of the disclosure.

Systems and methods are disclosed for pre-fetching address translations in a memory management unit (MMU) of a device. In an embodiment, the MMU detects a triggering condition related to one or more translation caches associated with the MMU, the triggering condition associated with a trigger address, generates a sequence descriptor describing a sequence of address translations to pre-fetch into the one or more translation caches, wherein the sequence of address translations comprises a plurality of address translations corresponding to a plurality of address ranges adjacent to an address range containing the trigger address, and issues an address translation request to the one or more translation caches for each of the plurality of address translations in the sequence of address translations, where the one or more translation caches pre-fetch at least one address translation of the plurality of address translations into the one or more translation caches based on the at least one address translation not being present in the one or more translation caches.

These and other aspects of the disclosure are described in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, certain embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the disclosure. The wireless communications system 100 contains UEs 1 . . . N. The UEs 1 . . . N can include cellular telephones, including "smartphones," personal digital assistant (PDAs), pagers, a laptop computer, a tablet computer, a desktop computer, and so on. For example, in FIG. 1, UEs 1 . . . 2 are illustrated as cellular calling phones, UEs 3 . . . 5 are illustrated as cellular touchscreen phones or "smartphones," and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
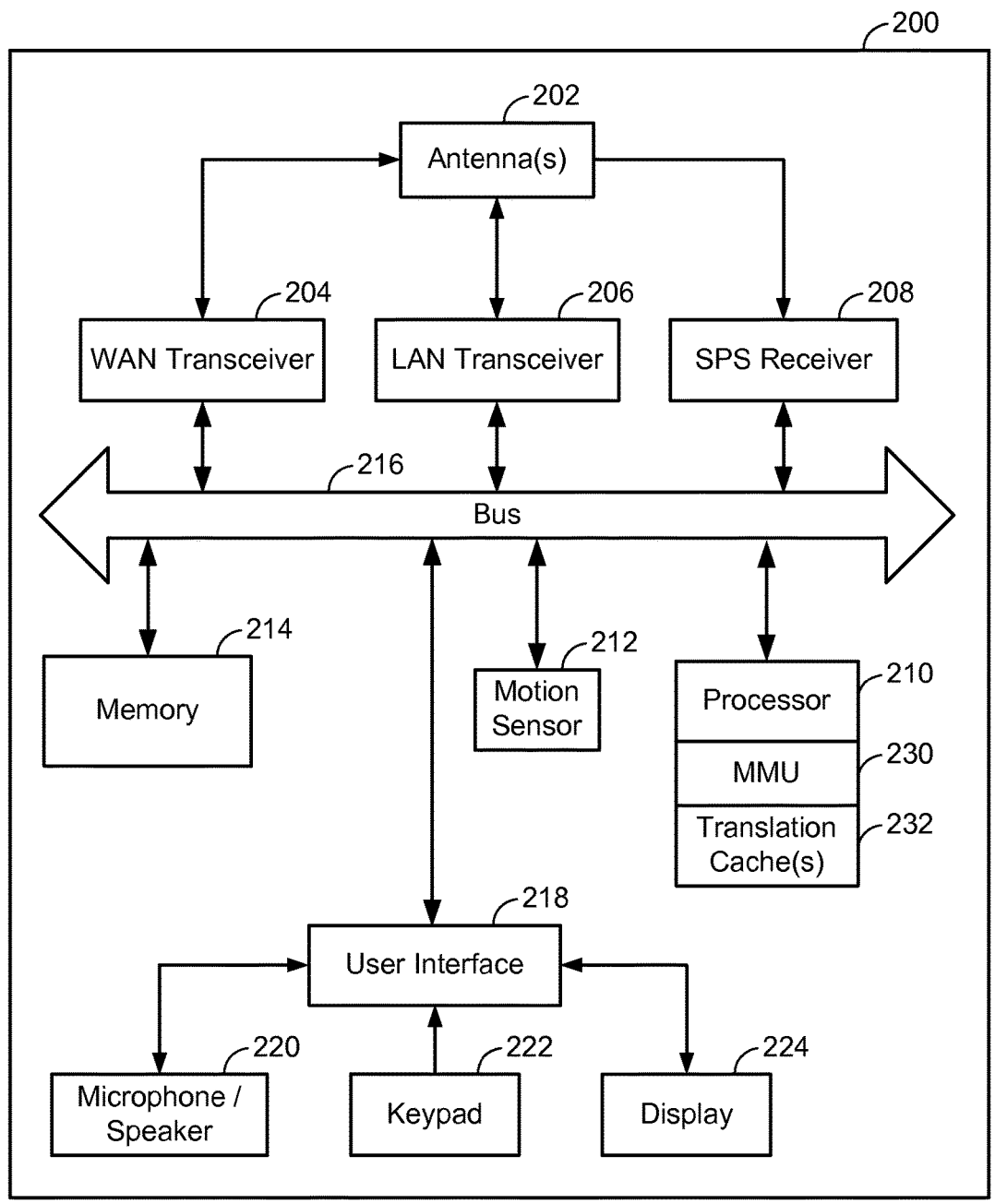
FIG. 2 illustrates an exemplary mobile device that may be used in an operating environment that can determine position using wireless techniques, according to one aspect of the disclosure.

The various embodiments of the disclosure may be implemented on any of a variety of devices, such as mobile device 200 in FIG. 2. Mobile device 200 may correspond to any of UEs 1 . . . N in FIG. 1. Referring to FIG. 2, for the sake of simplicity, the various features and functions illustrated in the block diagram of FIG. 2 are connected together using a common bus 216, which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

While internal components of mobile devices such as the mobile device 200 can be embodied with different hardware configurations, a basic high-level mobile device configuration for internal hardware components is shown in FIG. 2. The mobile device 200 may include one or more wide area network (WAN) transceiver(s) 204 that may be connected to one or more antennas 202. The WAN transceiver 204 comprises suitable devices, hardware, and/or software for communicating with and/or detecting signals to/from the RAN 120 in FIG. 1, and/or directly with other mobile devices within a network. In one aspect, the WAN transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (IEEE 802.16), etc. The mobile device 200 may also include one or more local area network (LAN) transceivers 206 that may be connected to one or more antennas 202. The LAN transceiver 206 comprises suitable devices, hardware, and/or software for communicating with and/or detecting signals to/from access point 125 in FIG. 1, and/or directly with other mobile devices within a network. In one aspect, the LAN transceiver 206 may comprise a Wi-Fi (802.11x) communication system suitable for communicating with one or more wireless access points; however in other aspects, the LAN transceiver 206 comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to access point 125 and/or RAN 120. Specifically, in the description presented below, when the term "WAP" is used, it should be understood that embodiments may include a mobile device 200 that can exploit signals from a plurality of access points 125, a plurality of RANs 120, or any combination of the two. The specific type of WAP being utilized by the mobile device 200 may depend upon the environment of operation. Moreover, the mobile device 200 may dynamically select between the various types of WAPs in order to arrive at an accurate position solution. In other embodiments, various network elements may operate in a peer-to-peer manner, whereby, for example, the mobile device 200 may be replaced with the WAP, or vice versa. Other peer-to-peer embodiments may include another mobile device (not shown) acting in place of one or more WAP.

An SPS receiver 208 may also be included in the mobile device 200. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the mobile device's 200 position using measurements obtained by any suitable SPS algorithm.

A motion sensor 212 may be coupled to a processor 210 to provide movement and/or orientation information which is independent of motion data derived from signals received by the WAN transceiver 204, the LAN transceiver 206 and the SPS receiver 208. By way of example, the motion sensor 212 may utilize an accelerometer (e.g., a MEMS device), a gyroscope, a geomagnetic sensor (e.g., a compass), an altimeter (e.g., a barometric pressure altimeter), and/or any other type of movement detection sensor. Moreover, the motion sensor 212 may include a plurality of different types of devices and combine their outputs in order to provide motion information. For example, the motion sensor 212 may use a combination of a multi-axis accelerometer and orientation sensors to provide the ability to compute positions in 2-D and/or 3-D coordinate systems.

The processor 210 may be connected to the WAN transceiver 204, LAN transceiver 206, the SPS receiver 208 and the motion sensor 212 via bus 216. The processor 210 may include one or more microprocessors, microcontrollers, and/or digital signal processors that provide processing functions, as well as other calculation and control functionality. The processor 210 may also be coupled to memory 214 for storing data and software instructions for executing programmed functionality within the mobile device 200. The memory 214 may be on-board the processor 210 (e.g., within the same IC package), and/or the memory may be external memory to the processor and functionally coupled over the common bus 216 (or other data bus).

The processor 210 may further include or be coupled to an MMU 230. The MMU 230 may be configured to pre-fetch address translations as described herein. In an embodiment, the MMU 230 may detect a triggering condition related to one or more translation caches 232 associated with the MMU 230, where the triggering condition is associated with a trigger address. The one or more translation caches 232 may be a component of the MMU 230, coupled to MMU 230, stored in the memory 214, or the like. The MMU 230 may further generate a sequence descriptor describing a sequence of address translations to pre-fetch into the one or more translation caches 232, where the sequence of address translations comprises a plurality of address translations corresponding to a plurality of address ranges adjacent to an address range containing the trigger address. The MMU 230 may further issue an address translation request to the one or more translation caches 232 for each of the plurality of address translations in the sequence of address translations, where the one or more translation caches 232 pre-fetch at least one address translation of the plurality of address translations into the one or more translation caches 232 based on the at least one address translation not being present in the one or more translation caches 232.

The mobile device 200 may include a user interface 218 which provides any suitable interface systems, such as a microphone/speaker 220, keypad 222, and display 224 that allows user interaction with the mobile device 200. The microphone/speaker 220 provides for voice communication services using the WAN transceiver 204 and/or the LAN transceiver 206. The keypad 222 comprises any suitable buttons for user input. The display 224 comprises any suitable display, such as, for example, a backlit LCD display, and may further include a touch screen display for additional user input modes.

As used herein, the mobile device 200 may be any portable or movable device or machine that is configurable to acquire wireless signals transmitted from, and transmit wireless signals to, one or more wireless communication devices or networks. As shown in FIG. 2, the mobile device 200 is representative of such a portable wireless device. Thus, by way of example but not limitation, the mobile device 200 may include a radio device, a cellular telephone device, a computing device, a personal communication system (PCS) device, or other like movable wireless communication equipped device, appliance, or machine. Also, "mobile device" is intended to include all devices, including wireless devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile device."

Figure 3:
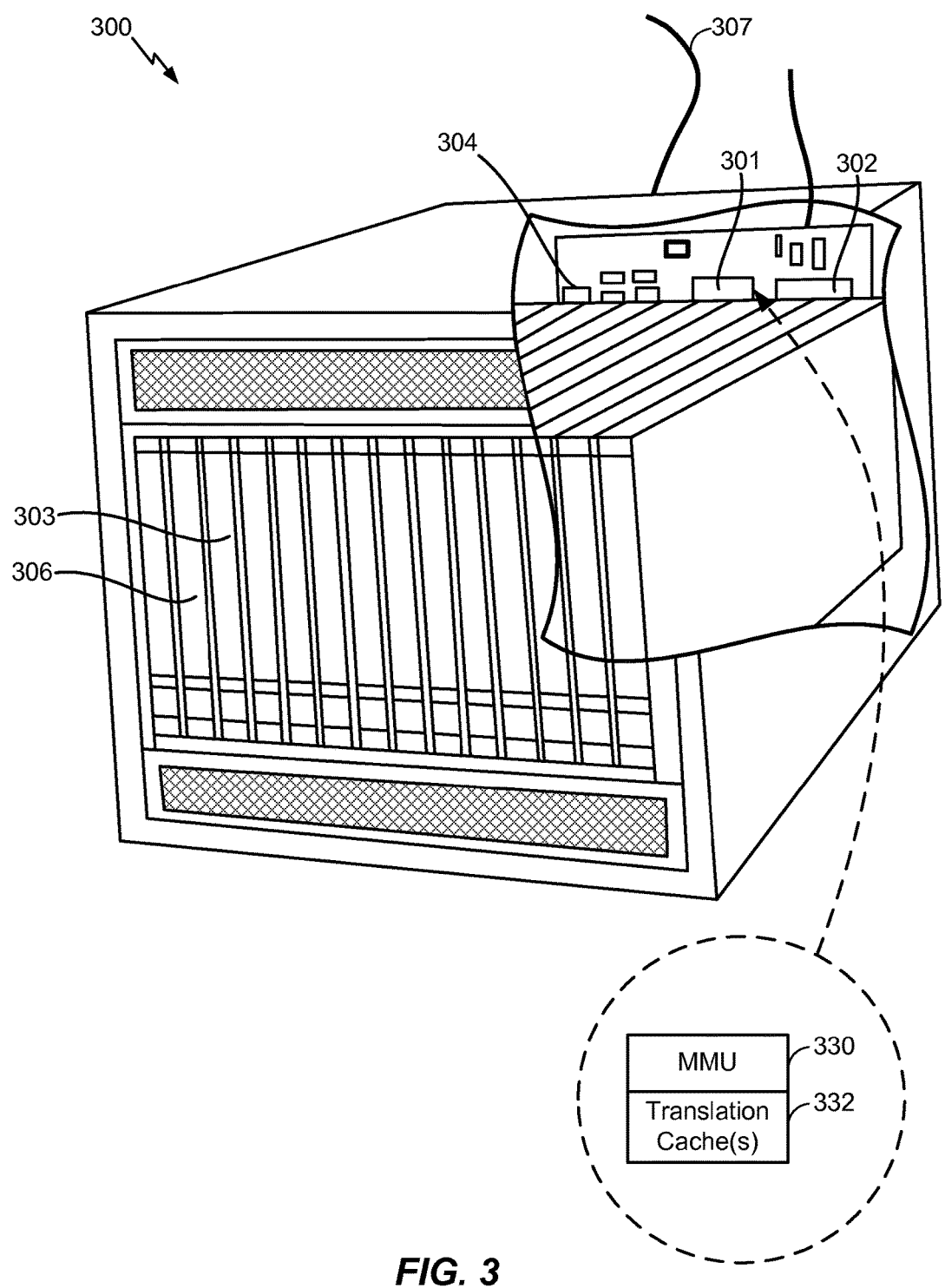
FIG. 3 illustrates a server in accordance with an embodiment of the disclosure.

The various embodiments may also be implemented on any of a variety of commercially available server devices, such as server 300 illustrated in FIG. 3. In an example, the server 300 may correspond to one example configuration of the server 170 in FIG. 1. In FIG. 3, the server 300 includes a processor 301 coupled to volatile memory 302 and a large capacity nonvolatile memory, such as a disk drive 303. The server 300 may also include a floppy disc drive, compact disc (CD) or DVD disc drive 306 coupled to the processor 301. The server 300 may also include network access ports 304 coupled to the processor 301 for establishing data connections with a network 307, such as a local area network coupled to other broadcast system computers and servers or to the Internet.

The processor 301 may further include or be coupled to an MMU 330. The MMU 330 may be configured to pre-fetch address translations as described herein. In an embodiment, the MMU 330 may detect a triggering condition related to one or more translation caches 332 associated with the MMU 330, where the triggering condition is associated with a trigger address. The one or more translation caches 332 may be a component of the MMU 330, coupled to the MMU 330, stored in volatile memory 302 or disk driver 303, or the like. The MMU 330 may further generate a sequence descriptor describing a sequence of address translations to pre-fetch into the one or more translation caches 332, where the sequence of address translations comprises a plurality of address translations corresponding to a plurality of address ranges adjacent to an address range containing the trigger address. The MMU 330 may further issue an address translation request to the one or more translation caches 332 for each of the plurality of address translations in the sequence of address translations, where the one or more translation caches 332 pre-fetch at least one address translation of the plurality of address translations into the one or more translation caches 332 based on the at least one address translation not being present in the one or more translation caches 332.

The following table provides definitions for certain terminology used throughout the present disclosure:

TABLE 1

Terminology and Definitions

| Terminology | Definition |
| --- | --- |
| Address Translation | The transform of an input transaction (which includes an input address) to an output transaction (which includes an address) based on the information in one or more translation tables and the MMU itself |
| Complete(d) Translation | A translation that is complete, and contains all the information necessary for address translation |
| Input Address | An address reference (transaction) performed by an upstream device |
| Memory Management Unit (MMU) | The hardware and/or software required to perform address translation (and other memory management functions) for the processor or peripheral devices |
| Output Address | An address reference (transaction) processed by the MMU |
| Partial Translation | A translation that is not complete, and contains only part of the information necessary for address translation |
| Pre-fetch Flag | A flag in each translation cache entry indicating that pre-fetch requests have been issued for the pre-fetch window containing the address corresponding to the translation cache entry |
| Pre-fetch Request | A request to initiate a sequence of pre-fetch address requests, relative to the trigger address that initiated the pre-fetch request |
| Pre-fetch Trigger | Translation cache activity is monitored to determine when to initiate pre-fetch requests; the pre-fetch trigger describes the specific conditions that must be satisfied in order to initiate pre-fetch (e.g., translation cache miss) |
| Response | Any response made by a device; however, in the context of an MMU, it often refers to the response to a request to read or write an address |
| Request | Any request performed by a device; however, in the context of an MMU, it often refers to a request to read or write an address |
| Sequence Descriptor | A sequence of addresses for which translations will be pre-fetched |
| Stride | The resolution (in bytes) of pre-fetch address requests; for a sequential pre-fetch sequence, the stride is the separation (in bytes) between adjacent pre-fetch address requests |
| System MMU (SMMU) | The MMU for peripheral devices; also known as the input-output MMU (IOMMU) |
| Transaction | A pair of a request and a response to the request. In a typical system, memory references performed by a device are executed by using transactions - a request to read/write memory and the response to that request |
| Translate | The process of applying the address translation transform |
| Translation | The information required to translate an input transaction |
| Translation Cache | A storage device capable of storing "translations" (either partial or complete); a TLB (translation look-aside buffer) is a specific form of translation cache that is sometimes used as a synonym for "translation cache" |
| Translation Table | The data structure in memory that contains translation information (e.g., address translation mapping information, memory attributes, memory permissions, etc . . .); also known as a "page-table" |
| Translation Table Walker | A machine that traverses (or walks) the translation table to collect the information required for address translation process; also known as a "page-table walker" |
| Trigger | The address corresponding to the translation cache |

TABLE 1-continued

Terminology and Definitions

| Terminology | Definition |
| --- | --- |
| Address | lookup that triggers a pre-fetch condition |
| Upstream Device | A device performing address references that will eventually be processed by the MMU |

Figure 4:
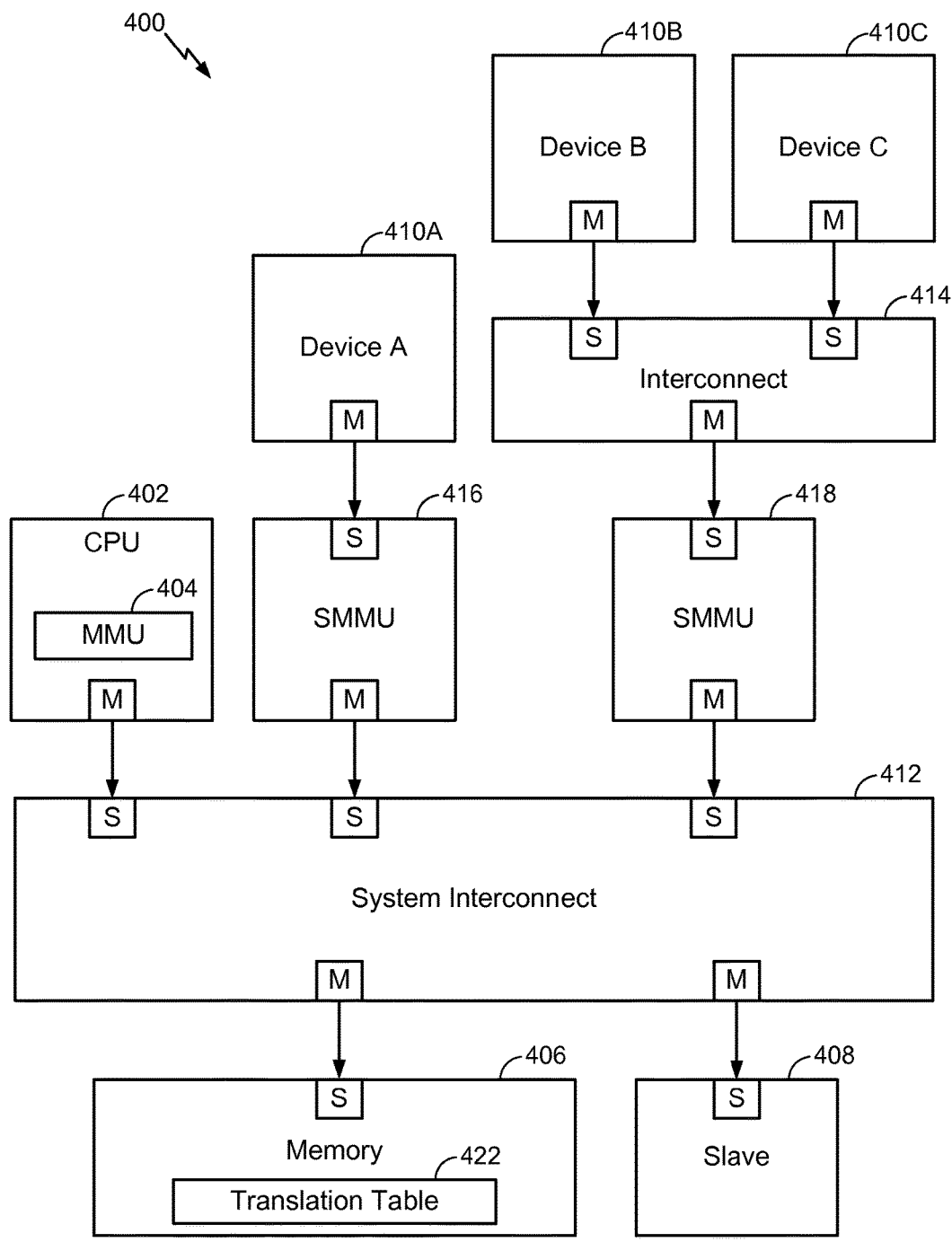
FIG. 4 illustrates an exemplary system according to an aspect of the disclosure.

FIG. 4 illustrates an exemplary system 400 according to an aspect of the disclosure. The system 400 may be incorporated into the mobile device 200 in FIG. 2 or the server 300 in FIG. 3. The components of system 400 include one or more central processors, such as processor 402 (which may correspond to processor 210 in FIG. 2 or processor 301 in FIG. 3), one or more interconnects (or buses), such as interconnects 412 and 414, one or more peripheral devices (or upstream devices), such as devices 410A-C, and one or more slave devices, such as memory 406 and slave 408. Devices 410A-C may include any other component of the device (e.g., mobile device 200 in FIG. 2 or server 300 in FIG. 3) that is "upstream" from the perspective of the MMU 404/SMMUs 416, 418. That is, devices 410A-C may be any component of the device embodying system 400 from which the MMU 404/SMMUs 416, 418 receive commands/instructions, such as a graphics processing unit (GPU), a digital signal processor (DSP), a Peripheral Component Interconnect Express (PCIe) root complex, a USB interface, a LAN interface, a Universal Asynchronous Receiver/Transmitter (UART), etc. Slave 408 may be any "downstream" component of the device embodying the system 400 that receives output from the MMU 404/SMMUs 416, 418. For example, Slave 408 may include system registers, memory mapped input/output, etc.

System 400 further includes an MMU 404 (which may correspond to MMU 230 in FIG. 2 or MMU 330 in FIG. 3) coupled to processor 402. As will be appreciated, although FIG. 4 illustrates MMU 404 as being part of processor 402, MMU 404 may be externally coupled to processor 402.

System 400 also includes SMMUs 416 and 418. An SMMU provides address translation services for upstream device traffic in much the same way that a processor's MMU, such as MMU 404, translates addresses for processor memory accesses. Referring to FIG. 4, each component includes an "S" and/or an "M," indicating that it is a "slave" to the upstream device and/or a "master" to the downstream device. As illustrated in FIG. 4, SMMUs, such as SMMUs 416 and 418, reside between a system device's master port and the system slaves. For example, as illustrated in FIG. 4, SMMUs 416 and 418 reside between the master ports of devices A-C 410A-C and the system slave, e.g., system interconnect 412.

A single SMMU may serve a single peripheral device or multiple peripheral devices, depending on system topology, throughput requirements, etc. FIG. 4 illustrates an example topology in which device A 410A has a dedicated SMMU 416 while devices B 410B and C 410C share SMMU 418. Note that although the arrows shown in FIG. 4 illustrate unidirectional communication between the illustrated components, this is simply to show exemplary communication through the MMU 404 and SMMUs 416 and 418. As is known in the art, the communication between the components in system 400 may be bidirectional.

The main functions of an MMU, such as MMU 404 and SMMUs 416 and 418, include address translation, memory protection, and attribute control. Address translation is the translation of an input address to an output address. Translation information is stored in translation tables that the MMU references to perform address translation. There are two main benefits of address translation. First, it allows devices to address a large physical address space. For example, a 32 bit device (i.e., a device capable of referencing $2^{32}$ address locations) can have its addresses translated by an MMU such that it may reference a larger address space (such as a 36 bit address space or a 40 bit address space). Second, it allows devices to have a contiguous view of buffers allocated in memory, despite the fact that memory buffers are typically fragmented, physically discontiguous, and scattered across the physical memory space.

Figure 5:
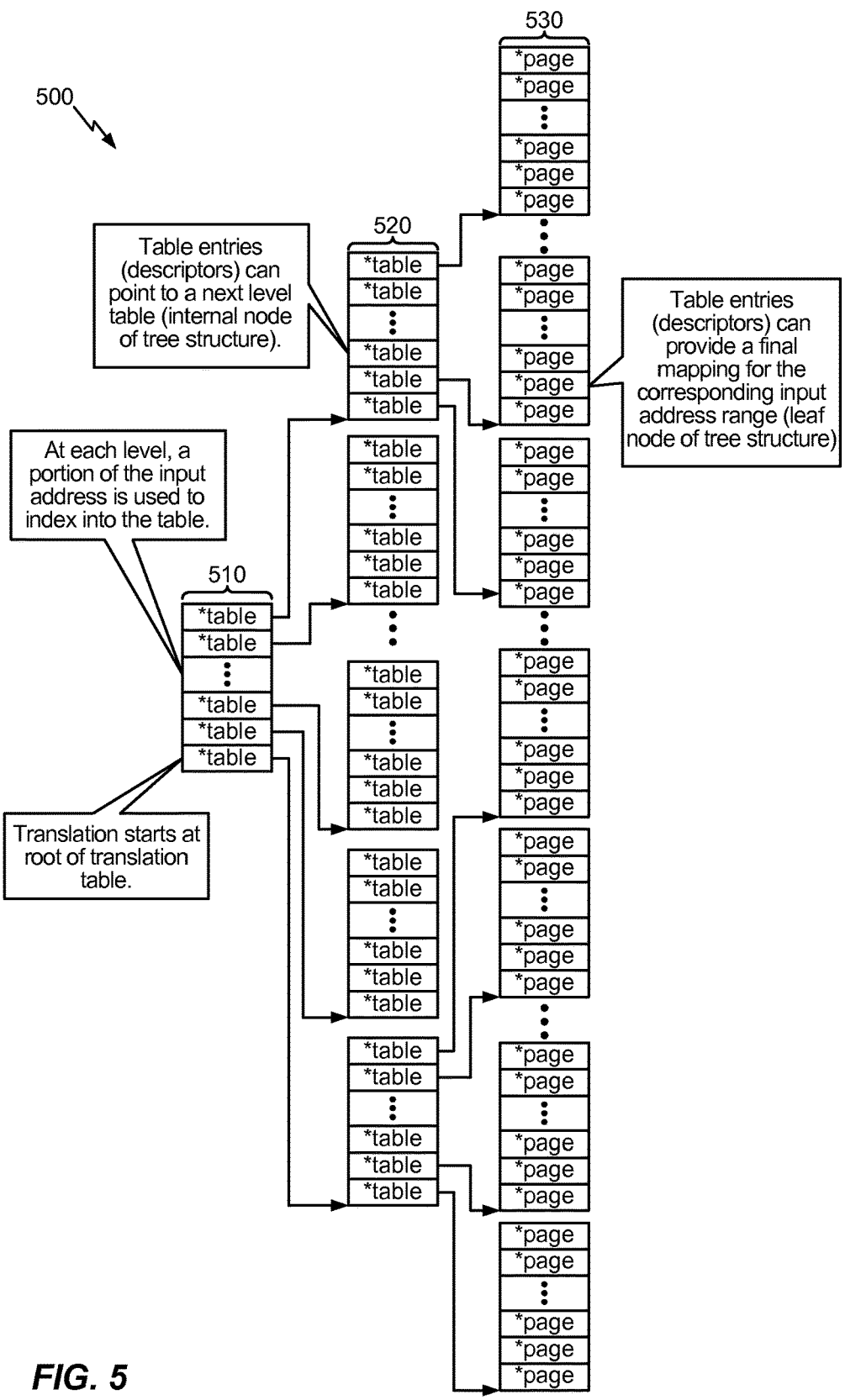
FIG. 5 illustrates an exemplary translation table according to an aspect of the disclosure.

FIG. 5 illustrates an exemplary translation table 500 according to an aspect of the disclosure. A translation table, such as translation table 500, contains information necessary to perform address translation for a range of input addresses. It consists of a top-level (or "root") table 510, one or more mid-level (or "intermediate") sets of sub-tables 520, and a set of bottom-level (or "leaf") tables 530 arranged in a multi-level "tree" structure. Note, for simplicity, FIG. 5 illustrates a single mid-level set of sub-tables 520, but there may be any number of mid-levels. The number of levels may be specified by the particular architecture. For example, the ARM architecture specifies the maximum number of levels required for a given translation regime.

The term "translation table entry" refers generically to any entry in a translation table. The term "page table entry" is used interchangeably with the term "translation table entry" herein. Within a given sub-table (e.g., sub-table 520 in FIG. 5), entries do not have to be of the same type. For example, one entry may be a "block/page" descriptor (indicating that the entry is a leaf node and thus the final mapping), and the adjacent entry could be a "table" descriptor, which points to the next level table (e.g., one of sub-tables 520 in FIG. 5). In other words, to perform translation, the three lookups illustrated in FIG. 5 (e.g., 510, 520, and 530) are not always required. Some table walks may terminate (i.e., encounter a block/page descriptor) after two levels (e.g., at 520), or even after one level (e.g., at 510). In these cases, the block/page descriptors will map a larger range of virtual address space.

Each sub-table 520 is indexed with a sub-segment of the input address. Each sub-table 510-530 consists of translation table descriptors (that is, may contain "leaf" nodes). There are three base types of descriptors: 1) an invalid descriptor, which indicates a mapping for the corresponding virtual address does not exist, 2) table descriptors, which contain a base address to the next level sub-table and may contain translation information (such as access permission) that is relevant to all sub-sequent descriptors encountered during the walk, and 3) block descriptors, which contain a base output address that is used to compute the final output address and attributes/permissions relating to block descriptors.

The process of traversing the translation table to perform address translation is known as a "translation table walk." A translation table walk is accomplished by using a sub-segment of an input address to index into the translation sub-table, and finding the next address until a block descriptor is encountered. A translation table walk consists of one or more "steps." Each "step" of a translation table walk involves 1) an access to the translation table, which includes reading (and potentially updating) the translation table, and 2) updating the translation state, which includes (but is not limited to) computing the next address to be referenced. Each step depends on the results from the previous step of the walk. For the first step, the address of the first translation table entry that is accessed is a function of the translation table base address and a portion of the input address to be translated. For each subsequent step, the address of the translation table entry accessed is a function of the translation table entry from the previous step and a portion of the input address.

A translation table walk is completed after a block descriptor is encountered and the final translation state is computed. If an invalid translation table descriptor is encountered, the walk has "faulted" and must be aborted or retried after the page table has been updated to replace the invalid translation table descriptor with a valid one (block or table descriptor). The combined information accrued from all previous steps of the translation table walk determines the final translation state of the "translation" and therefore influences the final result of the address translation (output address, access permissions, etc.).

Figure 6:
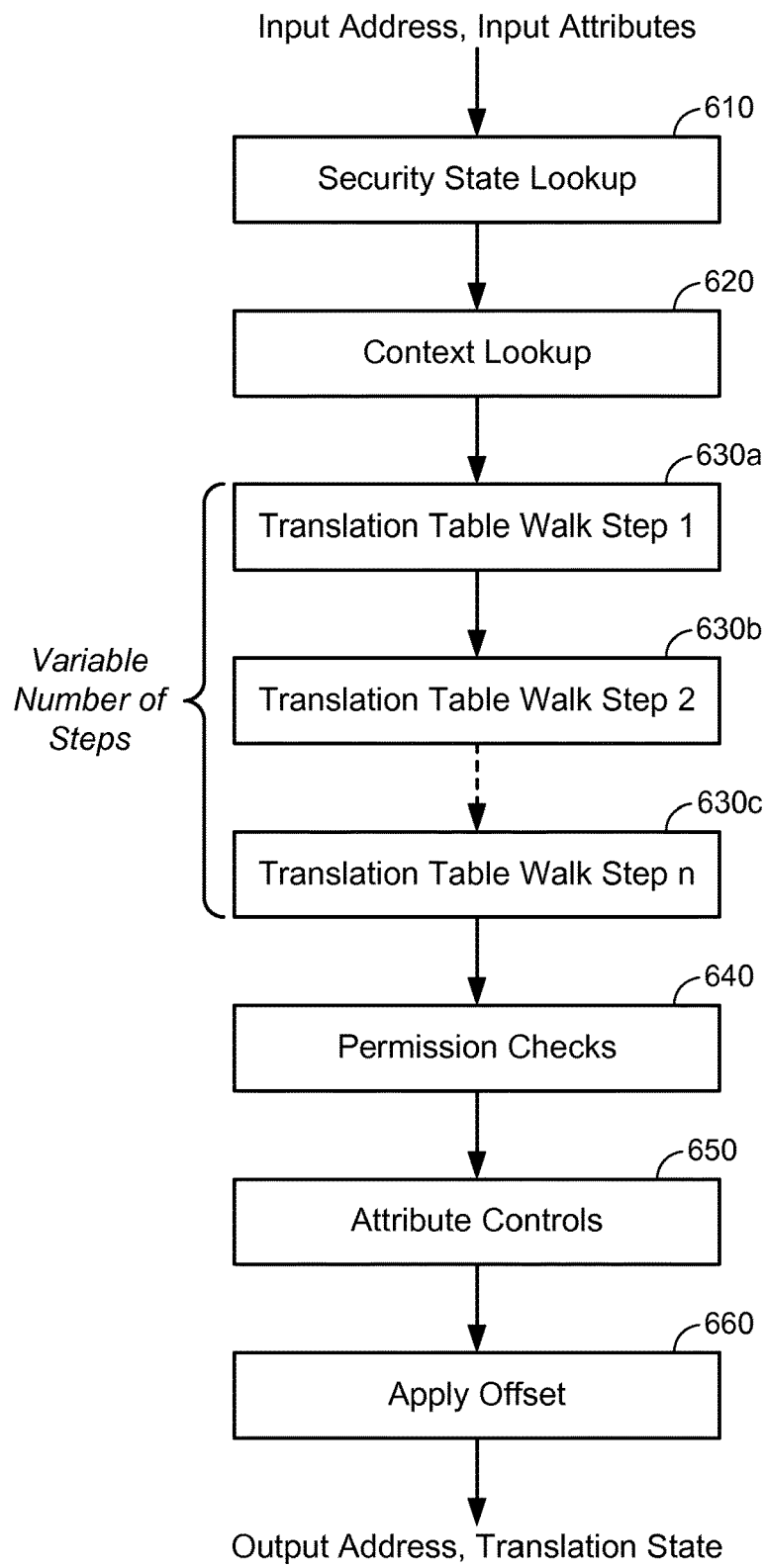
FIG. 6 illustrates the steps involved in address translation according to an aspect of the disclosure.

Address translation is the process of transforming an input address and set of attributes to an output address and attributes (derived from the final translation state). FIG. 6 illustrates the steps involved in address translation according to an aspect of the disclosure. The flow illustrated in FIG. 6 may be performed by an SMMU, such as SMMUs 416 or 418.

At 610, the SMMU performs a security state lookup. An SMMU is capable of being shared between secure and non-secure execution domains. The SMMU determines which domain an incoming transaction belongs to based on properties of that transaction. Transactions associated with a secure state are capable of accessing both secure and non-secure resources. Transactions associated with a non-secure state are only allowed to access non-secure resources.

At 620, the SMMU performs a context lookup. Each incoming transaction is associated with a "stream ID." The SMMU maps the "stream ID" to a context. The context determines how the SMMU will process the transaction: 1) bypass address translation so that default transformations are applied to attributes, but no address translation occurs (i.e., translation tables are not consulted), 2) fault, whereby the software is typically notified of a fault, and the SMMU terminates the transaction, such that it is not sent downstream to its intended target, or 3) perform translation, whereby translation tables are consulted to perform address translation and define attributes. Translation requires the resources of either one or two translation context banks (for single-stage and nested translation, respectively). A translation context bank defines the translation table(s) used for translation, default attributes, and permissions.

At 630, the SMMU performs a translation table walk. If a transaction requires translation, translation tables are consulted to determine the output address and attributes corresponding to the input address. If a transaction maps to a bypass context, translation is not required. Instead, default attributes are applied and no address translation is performed.

At 640, the SMMU performs a permissions check. The translation process defines permissions governing access to each region of memory translated. Permissions indicate which types of accesses are allowed for a given region (i.e., read/write), and whether or not an elevated permission level is required for access. When translation is complete, the defined permissions for the region of memory being accessed are compared against the attributes of the transaction. If the permissions allow the access associated with the transaction, the transaction is allowed to propagate downstream to its intended target. If the transaction does not have sufficient permissions, the SMMU raises a fault and the transaction is not allowed to propagate downstream.

At 650, the SMMU performs attribute controls. In addition to address translation, the SMMU governs the attributes associated with each transaction. Attributes indicate such things as the type of memory being accessed (e.g., device, normal, etc.), whether or not the memory region is shareable, hints indicating if the memory region should be cached, etc. The SMMU determines the attributes of outgoing transactions by combining/overriding information from several sources, such as 1) incoming attributes, whereby incoming attributes typically only affect output attributes when translation is bypassed, 2) statically programmed values in SMMU registers, and/or 3) translation table entries.

At 660, the SMMU applies an offset. Each translation table entry defines an output address mapping and attributes for a contiguous range of input addresses. A translation table can map various sizes of input address ranges. The output address indicated in a translation table entry is, therefore, the base output address of the range being mapped. To compute the final output address, the base output address is combined with an offset determined from the input address and the range size:

$$Output\_address = base\_output\_address + (input\_address \bmod range\_size)$$

In other words, the N least significant bits of input and output addresses are identical, where N is determined by the size of the address range mapped by a given translation table entry.

At the last step of the translation process illustrated in FIG. 6 the resulting translation state represents a completed translation. The completed translations can be stored in a translation cache to avoid having to perform all the steps of the translation table walk the next time an input address to the same block of memory is issued to the SMMU.

At any step (other than the last step) of the translation table process illustrated in FIG. 6 the resulting translation state represents a partially completed translation. The partially completed translations can be stored in a translation cache to avoid having to perform all the same steps of the translation table walk the next time a input address to the same (or adjacent) blocks of memory are issued to the SMMU. Partially completed translations are completed by performing the remaining steps of the translation walk.

The translation cache, sometimes referred to as a Translation Look-aside Buffer (TLB) is comprised of one or more translation cache entries. Translation caches store translation table information in one or more of the following forms: 1) fully completed translations, which contain all the information necessary to complete a translation, 2) partially completed translations, which contain only part of the information required to complete a translation such that the remaining information must be retrieved from the translation table or other translations caches, and/or 3) translation table data.

A translation cache assists in minimizing the average time required to translate subsequent addresses: 1) reduces the average number of accesses required to access the translation table during the translation process, and 2) keeps translations and/or translation table information in a fast storage device. A translation cache is usually quicker to access than the main memory store containing the translation tables. Specifically, referring to FIG. 6, instead of performing a translation table walk at 630, the SMMU can perform a translation cache lookup to determine whether or not the requested address is already present in the translation cache. If it is, the SMMU can skip the translation table walk at 630 and proceed to 640.

Figure 7:
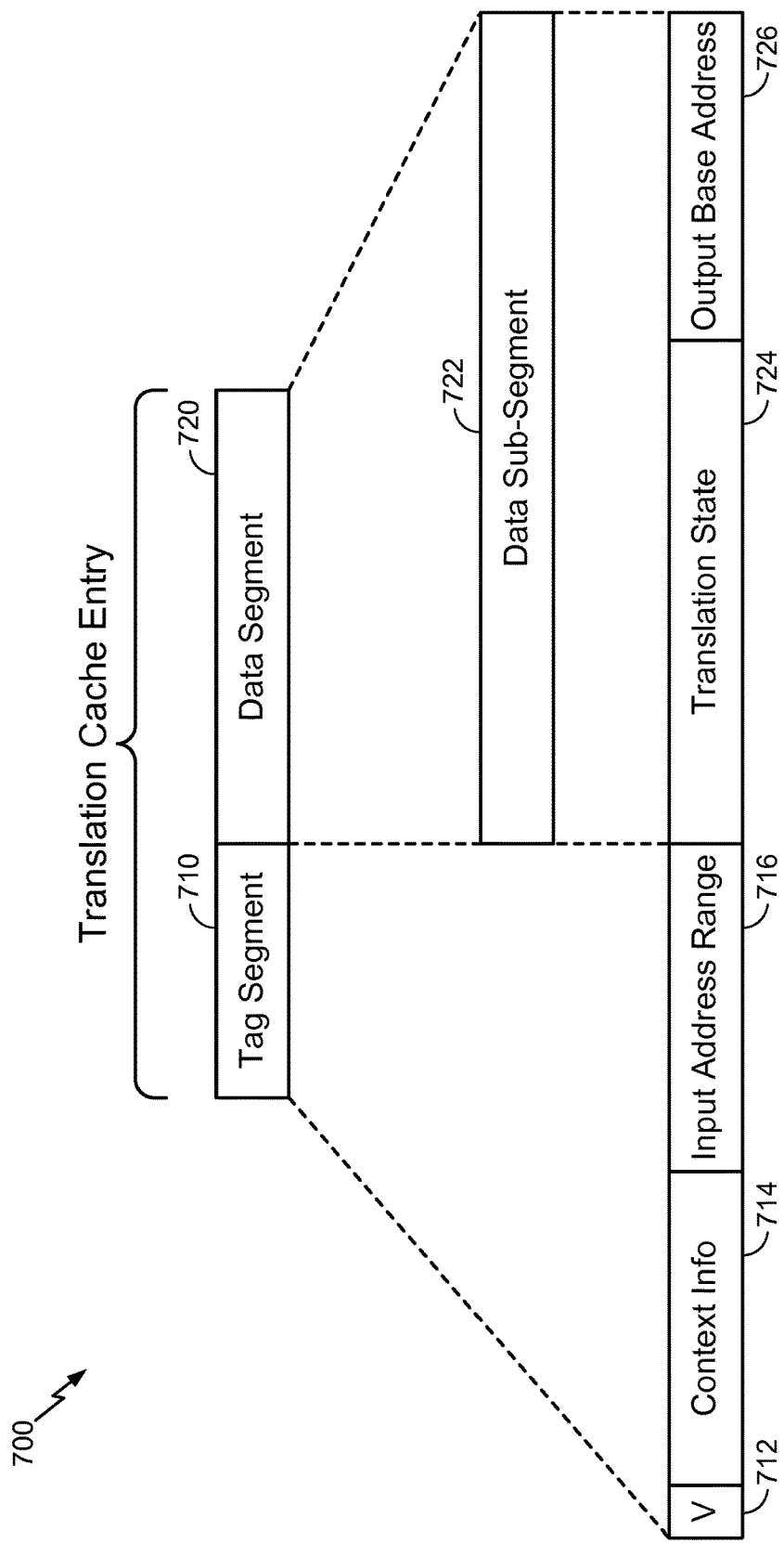
FIG. 7 illustrates an exemplary translation cache entry according to an aspect of the disclosure.

FIG. 7 illustrates an exemplary translation cache entry 700 according to an aspect of the disclosure. Translation cache entry 700 consists of a tag segment 710 and a data segment 720. The tag segment 710 comprises one or more fields that may be compared with a search comparand during a search (or lookup) of the translation cache. One of these fields may be a valid bit 712 indicating whether the translation cache entry 700 is populated with meaningful/valid information. Other fields may include an address space identifier, virtual machine ID, security state, exception level, and/or translation type, all which collectively form the "context information" 714.

Other fields may include a matching address range 716 for which the translation cache entry may (or may not) hold valid translation information. The address range 716 may be encoded as a start and end address value or by an address and address mask. Other fields, not shown, may include an invalidation address range that is used for TLB invalidation purposes. In some cases, the invalidation address range and the matching address range are always equivalent and therefore can be represented together as one field use the same storage/field (e.g., address range 716).

The data segment 720 comprises one or more data sub-segments 722 that contain information from the translation table and/or process of translation. Each data sub-segment 722 may store data for one 1) fully completed translation, 2) partially completed translation, or 3) translation table entry.

Data sub-segments, such as data sub-segment 722, holding a fully completed translation contain one or more data fields. One of these fields may include a valid bit (not shown) to indicate whether the data stored in the data sub-segment 722 is valid. In translation cache entries where there is only one data sub-segment 722, there is typically no need for a valid bit since the valid bit 712 in the tag segment 710 is sufficient to indicate whether the data sub-segment 722 contains valid information. The data sub-segments 722 further include one field to encode a base address 726 and one or more fields to encode the final translation state 724 resulting from performing all steps of the address translation process. This may include: 1) one or more fields that may encode the access permissions relating to the completed translation, 2) one or more fields that may encode the memory attributes relating to the completed translation, 3) one or more fields that may encode the cache attributes relating to the completed translation, or 4) one or more fields that may encode the system specific information relating to the completed translation.

Data sub-segments, such as data sub-segment 722, holding a partially completed translation contain one or more data fields. One of these fields may include a valid bit (not shown) to indicate whether the data stored in the sub-segment is valid. In translation cache entries where there is only one data sub-segment, there is typically no need for a valid bit since the valid bit 712 in the tag segment 710 is sufficient to indicate whether the data sub-segment 722 contains valid information. The data sub-segments 722 further include one field to encode a base address 726 and one or more fields to encode the final translation state 724 resulting from performing one or more of the steps of the address translation process. This may include: 1) one or more fields that may encode the access permissions relating to the partially completed translation, 2) one or more fields that may encode the memory attributes relating to the partially completed translation, 3) one or more fields that may encode the cache attributes relating to the partially completed translation, or 4) one or more fields that may encode the system specific information relating to the partially completed translation.

Data sub-segments 722 holding a translation table data translation may contain one or more data fields. One of these fields may include a valid bit to indicate whether the data stored in the data sub-segment 722 is valid. In translation cache entries where there is only one data sub-segment, there is typically no need for valid bit since the valid bit 712 contained in the tag segment is sufficient to indicate whether the data sub-segment 722 contains valid information. The data sub-segments 722 may further include one field to hold/store the translation table entry.

A full translation cache for completed translations consists of one or more (e.g., N) translation cache entries and each translation cache entry holds information for one completed translation.

Figure 8:
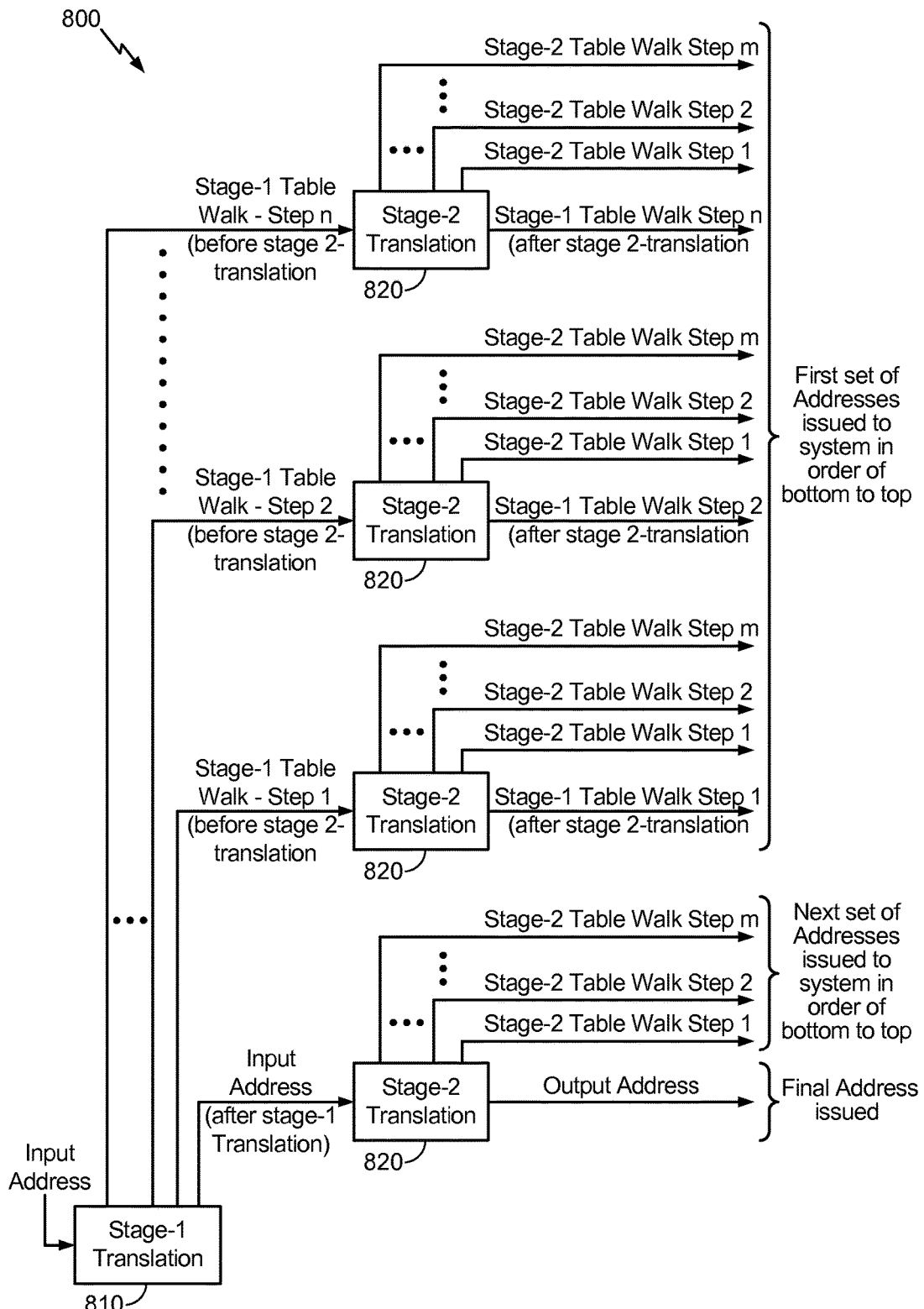
FIG. 8 illustrates an exemplary two-stage, or nested, translation flow according to an aspect of the disclosure.

A translation may be performed in a single stage (one-stage translation) or in two stages (two-stage or nested translation). FIG. 8 illustrates an exemplary two-stage, or nested, translation flow 800 according to an aspect of the disclosure. In a two-stage translation, the MMU, such as MMU 404 in FIG. 4, receives an input address to be translated by the Stage-1 Translation 810 followed by the Stage-2 Translation 820. A two-stage translation is called a "nested" translation because every reference from the Stage-1 translation process needs to undergo the Stage-2 translation process.

The Stage-1 translation 810 involves receiving an input address and generating a Stage-1 output address (which is also the Stage-2 input address). A translation table walk of the Stage-1 translation table may be required during the process of the Stage-1 translation 810. Each step/access to the Stage-1 translation table needs to undergo Stage-2 translation 820.

The Stage-2 translation 820 involves receiving a Stage-2 input address and generating a Stage-2 output address. A translation table walk of the Stage-2 translation table may be required during the process of Stage-2 translation 820.

Demand misses in the MMU translation cache negatively impact system performance and system costs by causing increased memory latency (delays), reduced bandwidth utilization, and increased buffering to hide delays. These negative impacts are significant in a single stage translation environment and even more significant in a nested (two stage) translation environment. Present solutions to minimize the number of such demand misses include predicting that previously used translations will be required in the future and storing them in a translation cache. This reduces the translation delay for future addresses if the translation is found in the translation cache. However, demand misses still occur for future addresses if the translation is not found in the translation cache. Another solution, referred to as "limited pre-fetch," is to pre-fetch an adjacent address with the hope of adding an adjacent translation in the translation cache. However, limited pre-fetching is not sufficient for multimedia cores, which almost always require multiple adjacent translations to be accessed simultaneously.

To minimize the number of demand misses, the present disclosure permits the MMU, such as MMU 404, to predict which addresses are likely to be accessed by an upstream device, and issues translation requests for those addresses. The translation will therefore be completed and stored in the MMU's translation cache, such that when the upstream device accesses the address for the first time, it does not incur a demand miss or the added latency of a translation table walk. Because the disclosed mechanism reduces (or eliminates) the number of demand misses, the delay through the MMU is reduced, which results in improved system performance and reduced system costs.

Figure 9:
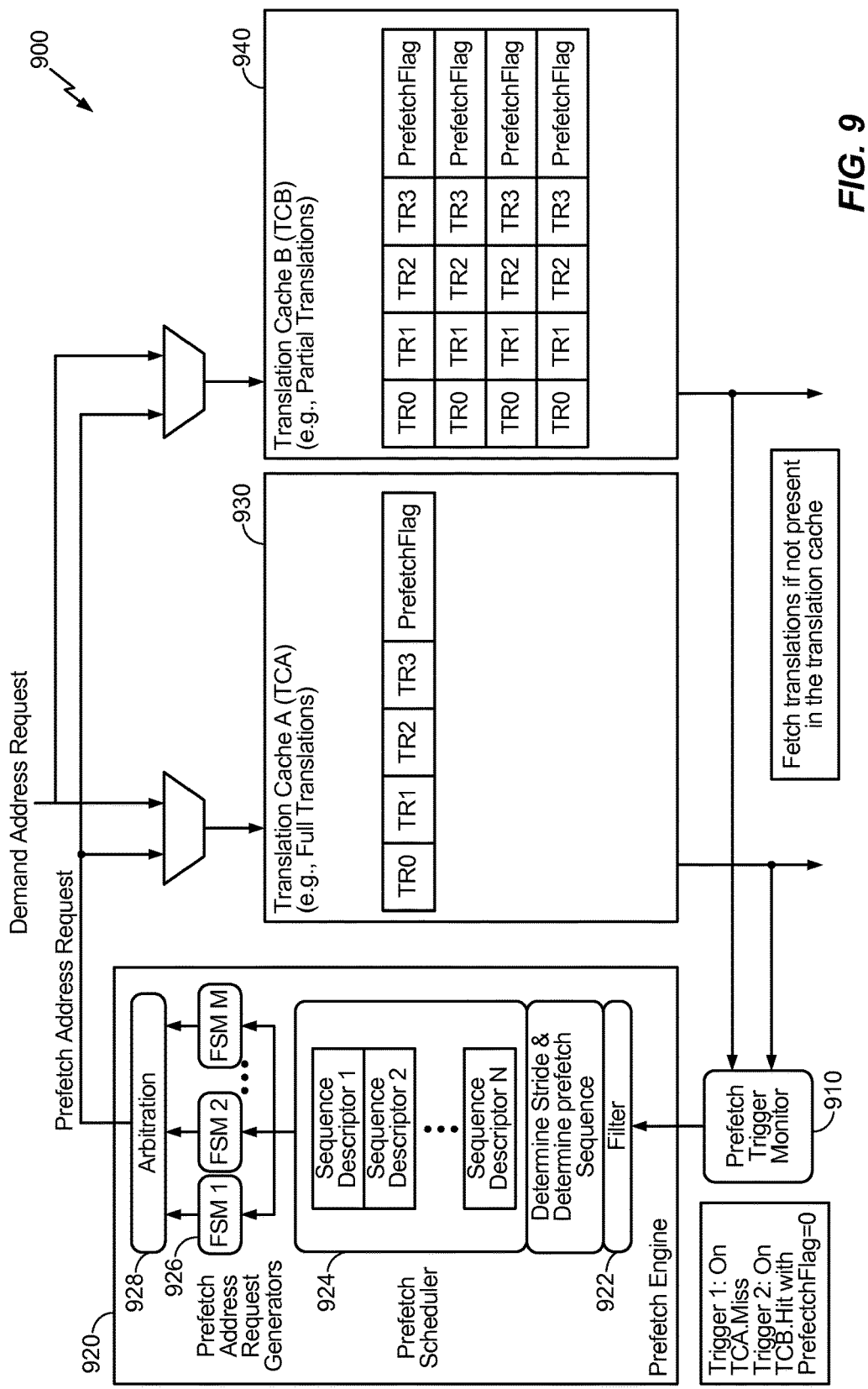
FIG. 9 illustrates an exemplary pre-fetch system according to an aspect of the disclosure.

FIG. 9 illustrates an exemplary pre-fetch system 900 according to an aspect of the disclosure. The pre-fetch system 900 may be embodied in an MMU, such as MMU 230 in FIG. 2, MMU 330 in FIG. 3, or MMU(s) 404 and SMMUs 416 and 418 in FIG. 4. As noted above, an MMU may be a hardware or software component. As such, the components of the pre-fetch system 900 may be hardware, software, or a combination of hardware and software.

Referring to FIG. 9, a pre-fetch trigger monitor 910 monitors translation cache activity to determine when to initiate pre-fetching, and for which address(es). The address that triggered pre-fetch is referred to herein as the "trigger address." There may be a number of events that trigger pre-fetching. For example, pre-fetching may be triggered when a translation cache hit is detected for an address (the "trigger address") within an aligned address range (window) that has not yet been subject to pre-fetching (this status is recorded in the pre-fetch flag of the cache entry). When triggered, the pre-fetch flag of the translation cache entry corresponding to the trigger address is set to indicate that pre-fetching has been performed on the address range containing the trigger address. This prevents future accesses to this window from initiating redundant pre-fetch requests.

As another example, pre-fetching may be triggered when a translation cache miss is detected. In this case, the pre-fetch flag of the translation cache entry corresponding to the trigger address is not set to indicate that pre-fetching has been performed on the address range containing the trigger address, as there is no such cache entry to update.

A pre-fetch engine 920 includes the following components: a filter 922, a pre-fetch scheduler 924, one or more pre-fetch address request generators (FSMs) 926, and an arbitrator 928. The filter 922 minimizes redundant pre-fetch requests. The pre-fetch scheduler 924 generates a sequence of pre-fetch addresses based on the address that triggered the pre-fetch. Each of the one or more pre-fetch address request generators 926 accepts a sequence descriptor from the pre-fetch scheduler 924 and generates pre-fetch address requests for each address in the sequence. Multiple pre-fetch address request generators 926 can operate in parallel to process multiple pre-fetch sequences concurrently. The arbitrator 928 arbitrates among available pre-fetch address requests and issues pre-fetch address requests to the translation caches 930 and 940, which may correspond to translation cache(s) 232 in FIG. 2 or 332 in FIG. 3. Although not required, FIG. 9 illustrates two caches to distinguish caches storing full translations (i.e., translation cache 930) and caches storing partial translations (i.e., translation cache 940). If a full translation for the pre-fetch address is not found, translation is performed and the translation caches 930 and 940 are filled accordingly.

Referring to the filter 922 now in greater detail, the filter 922 filters pre-fetch requests. When pre-fetching is triggered for a given trigger address, all existing pre-fetch requests in the pre-fetch engine 920 are examined. If the trigger address of the newly triggered pre-fetch request falls within the pre-fetch window of any existing pre-fetch requests, the newly triggered pre-fetch request is immediately discarded. This reduces the number of redundant address translations requested by the pre-fetch engine 920.

Figure 10:
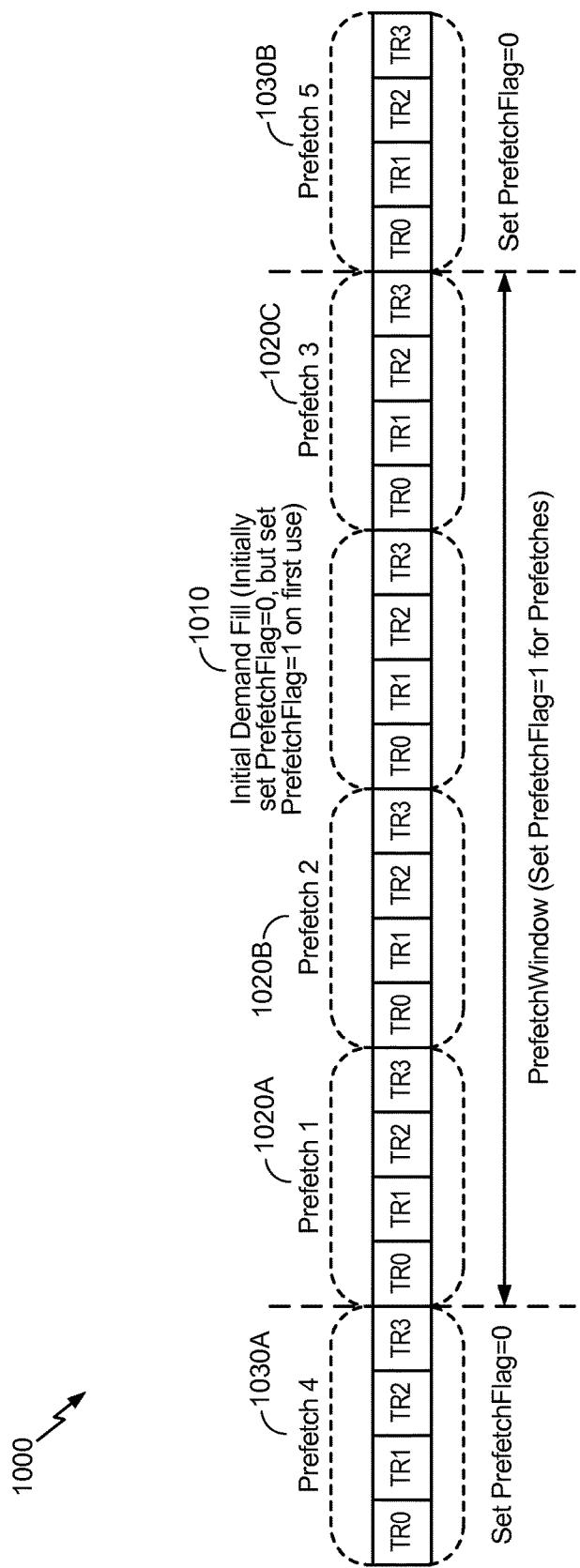
FIG. 10 illustrates an exemplary pre-fetch window according to an aspect of the disclosure.

When pre-fetching is triggered, the pre-fetch scheduler 924 generates a sequence descriptor describing a sequence of address translations that will be pre-fetched. The addresses in this sequence are generated based on the trigger address, a pre-fetch window size, and a stride length. FIG. 10 illustrates an exemplary pre-fetch window 1000 according to an aspect of the disclosure. The pre-fetch window size is programmable and defines an aligned address range containing the trigger address. The lower and upper bounds of the pre-fetch window 1000 are referred to herein as the "window start" and the "window end," respectively. For a given pre-fetch request, translation requests are limited to addresses bound by the pre-fetch window 1000. Note that an exception to this is the "extended pre-fetch window" discussed below, which generates requests above and below the window.

The pre-fetch window 1000 is divided into equally sized stride length regions 1010 and 1020A-C having a "stride length." A translation request is issued for each of the regions 1020A-C, but not for the stride length region 1010 containing the trigger address, since the translation for this region will be fetched (if necessary) as a result of the initial access to the trigger address. Note that the pre-fetch flag is set (e.g., to "1") for the regions within the pre-fetch window 1000, i.e., stride length regions 1010 and 1020A-C.

The stride length is the address granularity for which pre-fetch requests are issued. The stride length can be, for example, a fixed value (e.g., 4 kB, to match minimum page size in system), a programmable value (e.g., to allow clients with a priori knowledge of access patterns to select an optimal stride), or dynamically determined for each pre-fetch request. In the case where the stride length is dynamically determined, when pre-fetching is triggered by a translation cache hit, the stride length can be set based on the page size associated with trigger address, for example.

In addition to generating the translation requests at "stride length" intervals within the pre-fetch window 1000, the pre-fetch scheduler 924 generates translation requests for the addresses immediately above (higher address) and/or immediately below (lower address) the window boundary, i.e., regions 1030A-B. This can be controlled by programmable enables. Pre-fetching these address translations means that they will be resident in the translation caches 930 and 940 as the client accesses stride across the pre-fetch window boundary. However, when filling the translation caches 930 and 940 with these "extended pre-fetch window" translations, the pre-fetch flag of the cache entry is not set (e.g., remains "0"). This ensures that pre-fetch will be initiated if/when the upstream device crosses the pre-fetch window boundary and accesses these cached translations.

Figure 11:
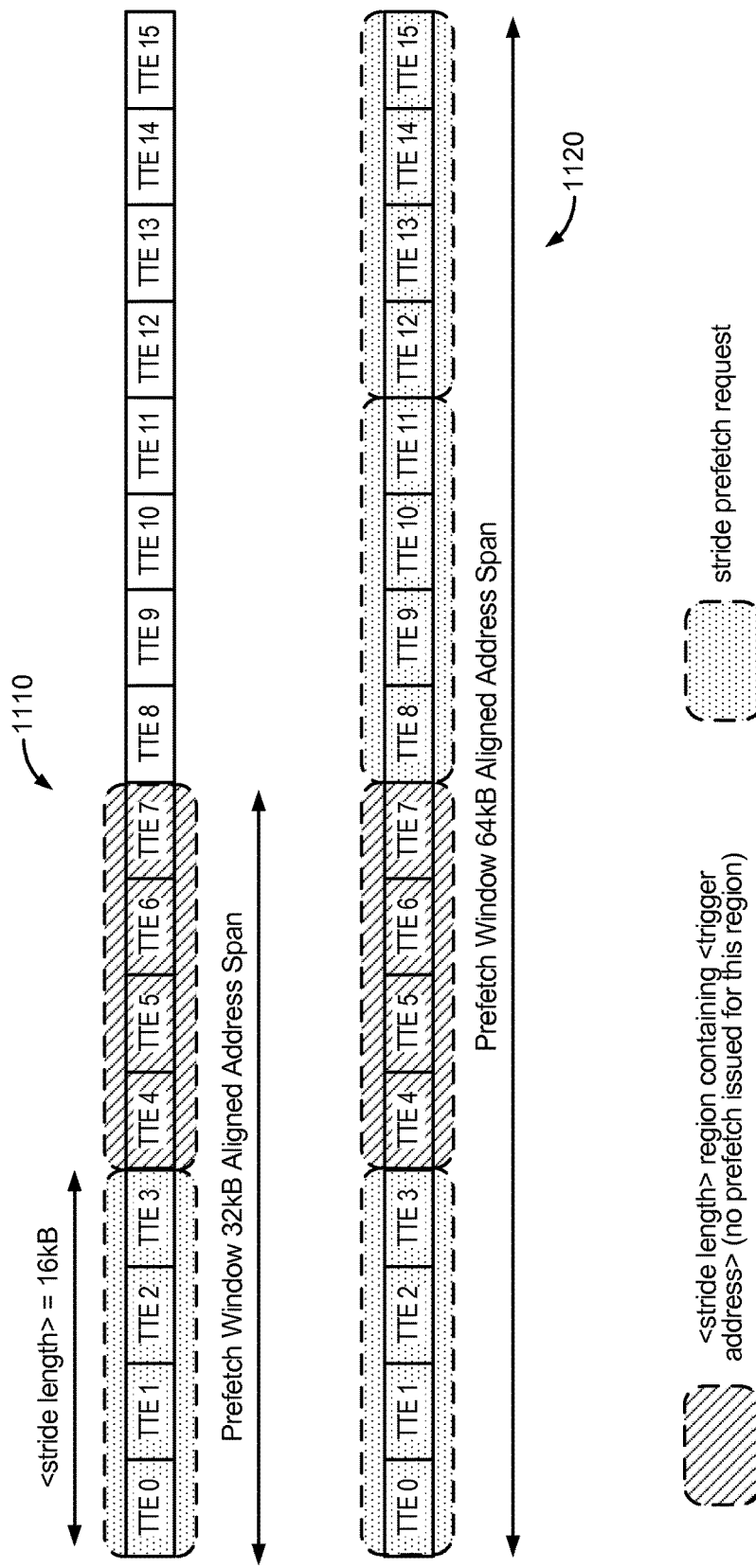
FIG. 11 illustrates pre-fetch window size and stride length examples, according to an aspect of the disclosure.

FIG. 11 illustrates pre-fetch window size and stride length examples 1110 and 1120, according to an aspect of the disclosure. In example 1110, the stride length is 16 kB and the window size is 32 kB. In example 1120, the stride length is 16 kB and the window size is 64 kB. Note that the term "TTE" means "translation table entry."

Figure 12:
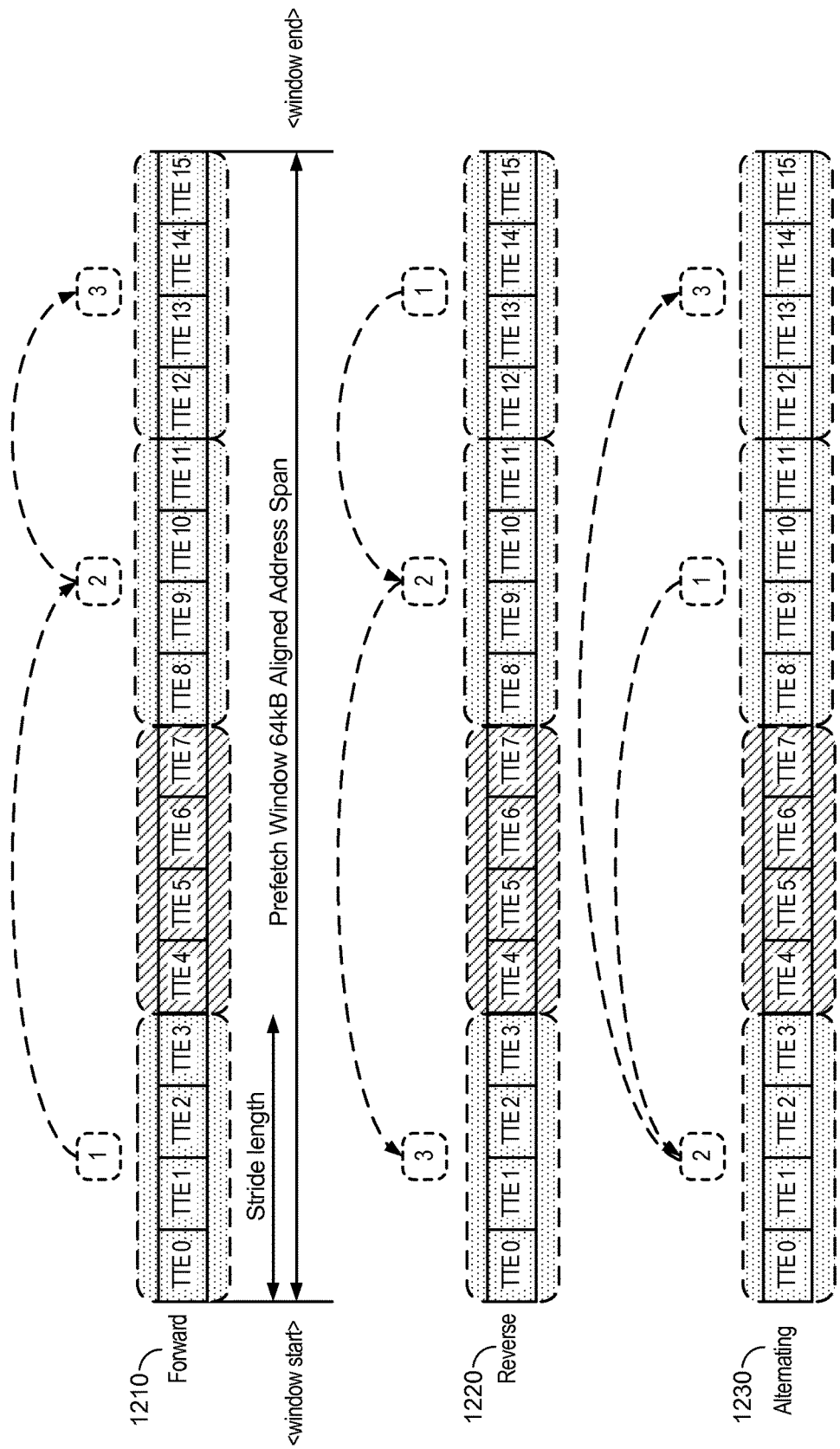
FIG. 12 illustrates various ways the stride length regions may be requested according to an aspect of the disclosure.

The order in which the pre-fetch scheduler 924 issues translation requests for each stride length region is programmable. FIG. 12 illustrates various ways the stride length regions may be requested according to an aspect of the disclosure. As noted above, the stride length region containing the trigger address is always skipped.

Pre-fetch window 1210 illustrates selecting stride length regions by going "forward." The first translation request is issued for the region including the "window start," and each subsequent address requested is incremented by the stride length until the stride length region containing the "window end" is requested.

Pre-fetch window 1220 illustrates selecting stride length regions by going in "reverse." The first translation request is issued for the region including the "window end," and each subsequent address requested is decremented by the stride length until the stride length region containing the window start is requested.

Pre-fetch window 1230 illustrates selecting stride length regions by "alternating." The first translation request is issued for the stride length region immediately above (high address) the target address, then for the stride length region immediately below the target address, then for the second stride length above the target address, then for the second stride length below the target address, etc. When the window boundary is reached, accesses wrap to the opposite end of the pre-fetch window 1230.

There may be any number of ways stride length regions may be requested. For example, the pre-fetch scheduler 924 may issue requests for stride length regions based on programming That is, the order of the sequence of stride length regions may be based on a programmable sequence generator. As another example, the order of the sequence of stride length regions may be random within the pre-fetch window.

Referring to FIG. 9, the pre-fetch scheduler 924 stores pre-fetch sequence descriptors in a first-in-first-out queue (FIFO). Sequence descriptors are enqueued to the FIFO when they are generated in response to a pre-fetch trigger. If the FIFO is full, there are two methods of flow control: discard newest request and discard oldest request. Referring to discarding the newest request, the sequence descriptor that is attempting to be pushed (enqueued) is instead discarded. This method can be used to guarantee that pre-fetch triggers are only serviced if they are guaranteed to initiate pre-fetch addresses requests. Referring to discarding the oldest request, the oldest request (at the head of the FIFO) is popped and discarded, therefore making room for the new request currently being issued. Sequence descriptors are dequeued when a pre-fetch address request generator 926 is available.

Referring to FIG. 9, a pre-fetch address request generator 926 generates pre-fetch address requests for each address in a sequence descriptor from the pre-fetch scheduler 924. Multiple pre-fetch address request generators 926 can operate in parallel, allowing concurrent resolution of multiple sequence descriptors. When a pre-fetch address request generator 926 has a request available, and the translation caches 930 and 940 are able to accept a pre-fetch address, a request is sent from the pre-fetch address request generator 926 to the translation caches 930 and 940. When the final address request for a given sequence descriptor is sent to the translation caches 930 and 940, the corresponding pre-fetch address request generator 926 becomes available to receive a new sequence descriptor.

If multiple pre-fetch address request generators 926 have a request available, the arbitrator 928 determines which is sent to the translation caches 930 and 940. The arbitration algorithm includes the following variants: round robin, programmable priority (e.g., prioritize based on upstream device), or some other priority based selection mechanism.

Note that the pre-fetch engine 920 does not need a response to pre-fetch address requests. Rather, it issues the requests for the purpose of filling the translation caches 930 and 940. Therefore, no state needs to be tracked for a given request after it has been sent.

Referring to FIG. 9, after the arbitrator 928 issues the pre-fetch address request to the translation caches 930 and 940, translation cache queries, translation table walks, etc. are performed to complete the address translation. As noted above, when populating the translation caches 930 and 940 with results initiated from pre-fetch transactions, the pre-fetch flag of the cache entry must be set. This prevents future accesses to the same pre-fetch window from initiating redundant pre-fetch requests.

Referring to TLB invalidation, when the MMU receives a TLB invalidation command, all pre-fetch requests in the pre-fetch engine 920 are simply discarded. Alternatively, discarding pre-fetch requests can be more discriminate, for example, based on the type of TLB invalidation command (e.g., match against address, virtual machine identifier (VMID), etc.).

Figure 13:
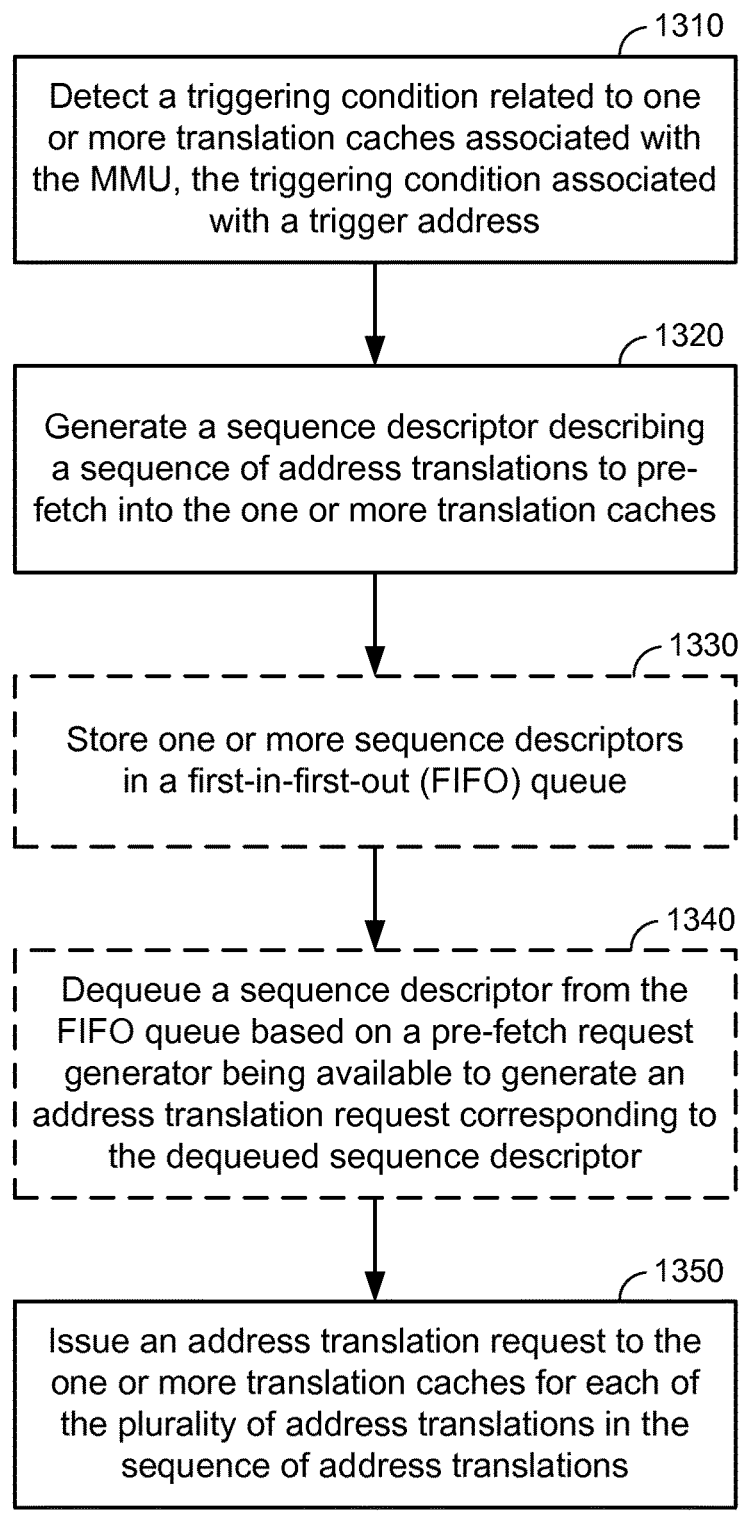
FIG. 13 illustrates an exemplary flow for pre-fetching address translations in a memory management unit (MMU) of a device according to at least one aspect of the disclosure.

FIG. 13 illustrates an exemplary flow for pre-fetching address translations in an MMU, such as MMU 230 in FIG. 2, MMU 330 in FIG. 3, MMU 404, SMMU 416, SMMU 418 in FIG. 4, according to at least one aspect of the disclosure.

At 1310, the MMU detects a triggering condition related to one or more translation caches associated with the MMU, such as translations cache(s) 232 in FIG. 2 or 332 in FIG. 3. The triggering condition may be associated with a trigger address, and may be a hit of the trigger address in one of the one or more translation caches. Alternatively, the triggering condition may be a miss of the trigger address in the one or more translation caches.

At 1320, the MMU generates a sequence descriptor describing a sequence of address translations to pre-fetch into the one or more translation caches. The sequence of address translations may be a plurality of address translations corresponding to a plurality of address ranges adjacent to an address range containing the trigger address.

The sequence descriptor may include the trigger address, a size of the sequence of address translations, and a stride length size. The size of the sequence of address translations may define a range of addresses for which address translations will be pre-fetched, where the size of the sequence of address translations is divided into stride length regions of the stride length size. The sequence descriptor may describe one address translation request per stride length region. The stride length size may be programmable, fixed, based on underlying cache structure, or dynamically determined based on a page size of the trigger address.

The sequence descriptor may define address translation requests for a stride length region immediately above and a stride length region immediately below the range of addresses defined by the size of the sequence of address translations. In that case, a pre-fetch flag in one or more translation cache entries corresponding to the stride length region immediately above the range of addresses defined by the sequence descriptor size and the stride length region immediately below the range of addresses defined by the sequence descriptor size may not be set.

Although not illustrated in FIG. 13, the flow may further include determining whether or not the trigger address is contained in a sequence descriptor of an active address translation request. In that case, the sequence descriptor describing the sequence of address translations to pre-fetch is not generated based on the trigger address being contained in the sequence descriptor of the active address translation request.

At 1330, the MMU optionally stores one or more sequence descriptors in a FIFO queue.

At 1340, the MMU optionally dequeues a sequence descriptor from the FIFO queue based on a pre-fetch request generator being available to generate an address translation request corresponding to the dequeued sequence descriptor. The pre-fetch request generator may generate a pre-fetch request for each address defined in the dequeued sequence descriptor. An attempt to store a new sequence descriptor in a full FIFO queue results in the new sequence descriptor being discarded. Alternatively, an attempt to store a new sequence descriptor in a full FIFO queue results in an oldest sequence descriptor in the FIFO queue being discarded. In an embodiment, multiple pre-fetch request generators may operate in parallel on multiple sequence descriptors from the FIFO queue.

At 1350, the MMU issues an address translation request to the one or more translation caches for each of the plurality of address translations in the sequence of address translations. The one or more translation caches may pre-fetch at least one address translation of the plurality of address translations into the one or more translation caches based on the at least one address translation not being present in the one or more translation caches.

An order in which address translation requests are pre-fetched may be an order of forward from a first stride length region of address translations of the sequence of address translations, an order of reverse from a last stride length region of address translations of the sequence of address translations, an order of alternating from a stride length region of address translations adjacent to a stride length region of address translations containing the trigger address, a programmable order, or a random order.

Although not illustrated in FIG. 13, the flow may further include setting a pre-fetch flag in a first translation cache entry corresponding to the trigger address to ensure that pre-fetch is performed for an address range corresponding to the first translation cache entry only once, and setting the pre-fetch flag in a second translation cache entry corresponding to at least one of the plurality of address ranges adjacent to the address range containing the trigger address to ensure that pre-fetch is not triggered on subsequent hits to the second translation cache entry. In that case, the triggering condition may be the pre-fetch flag not being set.

Figure 14:
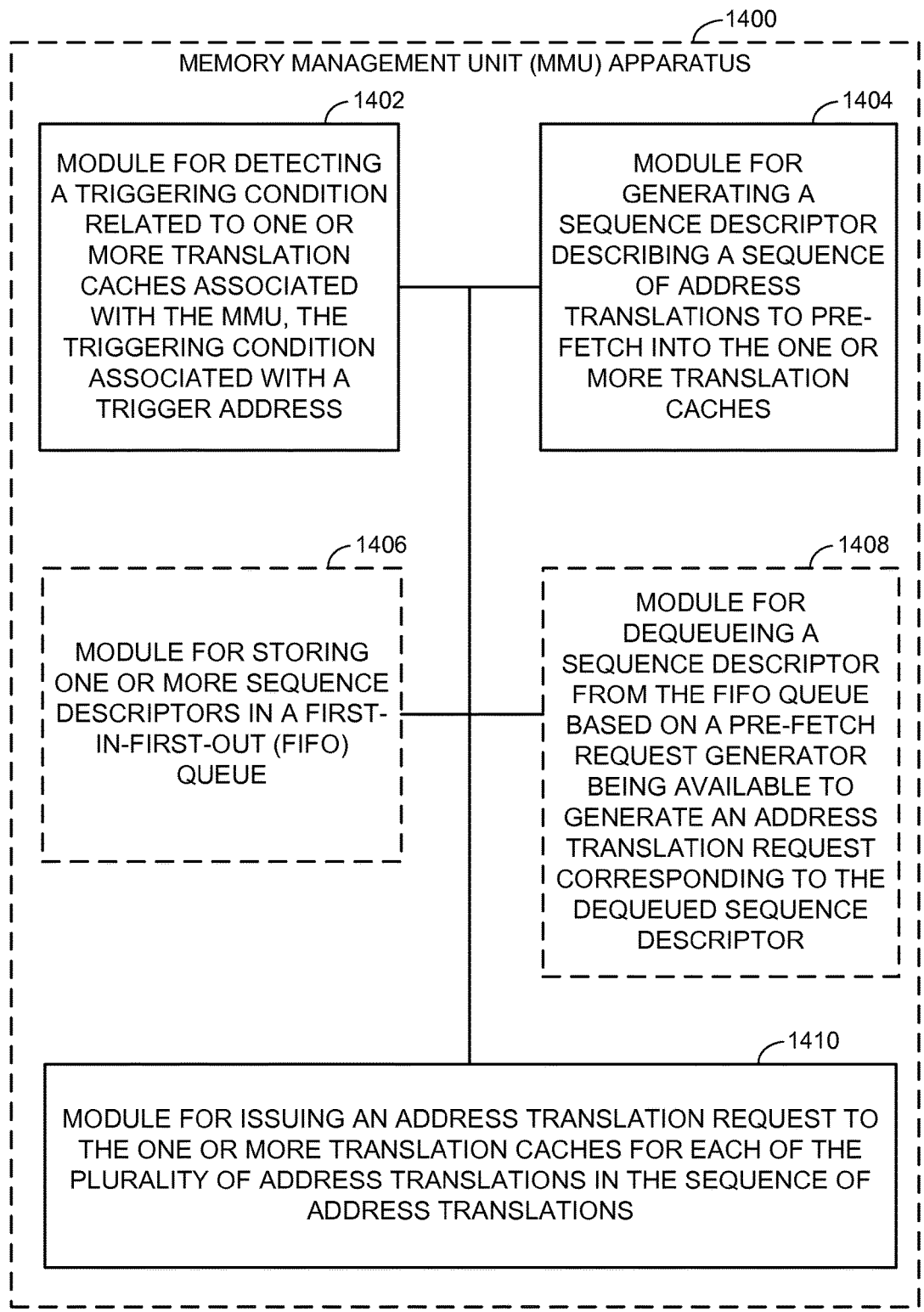
FIG. 14 is a simplified block diagram of several sample aspects of an apparatus configured to support communication as taught herein.

FIG. 14 illustrates an example MMU apparatus 1400 represented as a series of interrelated functional modules. A module for detecting 1402 may correspond at least in some aspects to, for example, a pre-fetch trigger monitor, such as pre-fetch trigger monitor 910 in FIG. 9, as discussed herein. A module for generating 1404 may correspond at least in some aspects to, for example, a pre-fetch scheduler, such as pre-fetch scheduler 924 in FIG. 9, as discussed herein. An optional module for storing 1406 may correspond at least in some aspects to, for example, a pre-fetch scheduler, such as pre-fetch scheduler 924 in FIG. 9, as discussed herein. An optional module for dequeueing 1408 may correspond at least in some aspects to, for example, a pre-fetch address request generator, such as pre-fetch address request generator 926 in FIG. 9, as discussed herein. A module for issuing 1410 may correspond at least in some aspects to, for example, a pre-fetch address request generator, such as pre-fetch address request generator 926 in FIG. 9, as discussed herein.

The functionality of the modules of FIG. 14 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 14, as well as other components and functions described herein, may be implemented using any suitable means. Such means also may be implemented, at least in part, using corresponding structure as taught herein. For example, the components described above in conjunction with the "module for" components of FIG. 14 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of pre-fetching address translations in a memory management unit (MMU) of a device, comprising:
  detecting a triggering condition related to one or more translation caches associated with the MMU, the triggering condition associated with a trigger address;
  generating a sequence descriptor describing a sequence of address translations to pre-fetch into the one or more translation caches, wherein the sequence of address translations comprises a plurality of address translations corresponding to a plurality of address ranges adjacent to an address range containing the trigger address;
  issuing an address translation request to the one or more translation caches for each of the plurality of address translations in the sequence of address translations, wherein the one or more translation caches pre-fetch at least one address translation of the plurality of address translations into the one or more translation caches based on the at least one address translation not being present in the one or more translation caches;
setting a pre-fetch flag in a first translation cache entry corresponding to the trigger address to ensure that pre-fetch is performed for an address range corresponding to the first translation cache entry only once; and
setting the pre-fetch flag in a second translation cache entry corresponding to at least one of the plurality of address ranges adjacent to the address range containing the trigger address to ensure that pre-fetch is not triggered on subsequent hits to the second translation cache entry.

2. The method of claim 1, wherein the triggering condition comprises a hit of the trigger address in one of the one or more translation caches.

3. The method of claim 1, wherein the triggering condition comprises the pre-fetch flag not being set.

4. The method of claim 1, wherein the triggering condition comprises a miss of the trigger address in the one or more translation caches.

5. The method of claim 1, further comprising:
determining whether or not the trigger address is contained in a sequence descriptor of an active address translation request,
wherein the sequence descriptor describing the sequence of address translations to pre-fetch is not generated based on the trigger address being contained in the sequence descriptor of the active address translation request.

6. The method of claim 1, wherein the sequence descriptor includes the trigger address, a size of the sequence of address translations, and a stride length size, wherein the size of the sequence of address translations defines a range of addresses for which address translations will be pre-fetched, wherein the size of the sequence of address translations is divided into stride length regions of the stride length size, and wherein the sequence descriptor describes one address translation request per stride length region.

7. The method of claim 6, wherein the stride length size is programmable, fixed, based on underlying cache structure, or dynamically determined based on a page size of the trigger address.

8. The method of claim 6, wherein the sequence descriptor defines address translation requests for a stride length region immediately above and a stride length region immediately below the range of addresses defined by the size of the sequence of address translations.

9. The method of claim 8, wherein a pre-fetch flag in one or more translation cache entries corresponding to the stride length region immediately above the range of addresses defined by the size of the sequence of address translations and the stride length region immediately below the range of addresses defined by the size of the sequence of address translations is not set.

10. The method of claim 6, wherein an order in which address translation requests are pre-fetched comprises an order of forward from a first stride length region of address translations of the sequence of address translations, an order of reverse from a last stride length region of address translations of the sequence of address translations, an order of alternating from a stride length region of address translations adjacent to a stride length region of address translations containing the trigger address, a programmable order, or a random order.

11. The method of claim 1, further comprising:
storing one or more sequence descriptors in a first-in-first-out (FIFO) queue; and
dequeueing a sequence descriptor from the FIFO queue based on a pre-fetch request generator being available to generate an address translation request corresponding to the dequeued sequence descriptor.

12. The method of claim 11, wherein the pre-fetch request generator generates a pre-fetch request for each address defined in the sequence descriptor.

13. The method of claim 11, wherein multiple pre-fetch request generators operate in parallel on multiple sequence descriptors from the FIFO queue.

14. The method of claim 11, wherein an attempt to store a new sequence descriptor in a full FIFO queue results in the new sequence descriptor being discarded.

15. The method of claim 11, wherein an attempt to store a new sequence descriptor in a full FIFO queue results in an oldest sequence descriptor in the FIFO queue being discarded.

16. An apparatus for pre-fetching address translations in a memory management unit (MMU) of a device, comprising:
a logic circuit configured to detect a triggering condition related to one or more translation caches associated with the MMU, the triggering condition associated with a trigger address;
a logic circuit configured to generate a sequence descriptor describing a sequence of address translations to pre-fetch into the one or more translation caches, wherein the sequence of address translations comprises a plurality of address translations corresponding to a plurality of address ranges adjacent to an address range containing the trigger address;
a logic circuit configured to issue an address translation request to the one or more translation caches for each of the plurality of address translations in the sequence of address translations, wherein the one or more translation caches pre-fetch at least one address translation of the plurality of address translations into the one or more translation caches based on the at least one address translation not being present in the one or more translation caches;
a logic circuit configured to set a pre-fetch flag in a first translation cache entry corresponding to the trigger address to ensure that pre-fetch is performed for an address range corresponding to the first translation cache entry only once; and
a logic circuit configured to set the pre-fetch flag in a second translation cache entry corresponding to at least one of the plurality of address ranges adjacent to the address range containing the trigger address to ensure that pre-fetch is not triggered on subsequent hits to the second translation cache entry.

17. The apparatus of claim 16, wherein the triggering condition comprises a hit of the trigger address in one of the one or more translation caches.

18. The apparatus of claim 16, wherein the triggering condition comprises the pre-fetch flag not being set.

19. The apparatus of claim 16, wherein the triggering condition comprises a miss for the trigger address in the one or more translation caches.

20. The apparatus of claim 16, further comprising:
a logic circuit configured to determine whether or not the trigger address is contained in a sequence descriptor of an active address translation request,
wherein the sequence descriptor describing the sequence of address translations to pre-fetch is not generated based on the trigger address being contained in the sequence descriptor of the active address translation request.

21. The apparatus of claim 16, wherein the sequence descriptor includes the trigger address, a size of the sequence of address translations, and a stride length size, wherein the size of the sequence of address translations defines a range of addresses for which address translations will be pre-fetched, wherein the size of the sequence of address translations is divided into stride length regions of the stride length size, and wherein the sequence descriptor describes one address translation request per stride length region.

22. The apparatus of claim 21, wherein the stride length size is programmable, fixed, based on underlying cache structure, or dynamically determined based on a page size of the trigger address.

23. The apparatus of claim 21, wherein the sequence descriptor defines address translation requests for a stride length region immediately above and a stride length region immediately below the range of addresses defined by the size of the sequence of address translations.

24. The apparatus of claim 23, wherein a pre-fetch flag in one or more translation cache entries corresponding to the stride length region immediately above the range of addresses defined by the size of the sequence of address translations and the stride length region immediately below the range of addresses defined by the size of the sequence of address translations is not set.

25. The apparatus of claim 21, wherein an order in which address translation requests are pre-fetched comprises an order of forward from a first stride length region of address translations of the sequence of address translations, an order of reverse from a last stride length region of address translations of the sequence of address translations, an order of alternating from a stride length region of address translations adjacent to a stride length region of address translations containing the trigger address, a programmable order, or a random order.

26. The apparatus of claim 16, further comprising:
   a logic circuit configured to store one or more sequence descriptors in a first-in-first-out (FIFO) queue; and
   a logic circuit configured to dequeue a sequence descriptor from the FIFO queue based on a pre-fetch request generator being available to generate an address translation request corresponding to the dequeued sequence descriptor.

27. An apparatus for pre-fetching address translations in a memory management unit (MMU) of a device, comprising:
   hardware means for detecting a triggering condition related to one or more translation caches associated with the MMU, the triggering condition associated with a trigger address;
   hardware means for generating a sequence descriptor describing a sequence of address translations to pre-fetch into the one or more translation caches, wherein the sequence of address translations comprises a plurality of address translations corresponding to a plurality of address ranges adjacent to an address range containing the trigger address;
   hardware means for issuing an address translation request to the one or more translation caches for each of the plurality of address translations in the sequence of address translations, wherein the one or more translation caches pre-fetch at least one address translation of the plurality of address translations into the one or more translation caches based on the at least one address translation not being present in the one or more translation caches;
   hardware means for setting a pre-fetch flag in a first translation cache entry corresponding to the trigger address to ensure that pre-fetch is performed for an address range corresponding to the first translation cache entry only once; and
   hardware means for setting the pre-fetch flag in a second translation cache entry corresponding to at least one of the plurality of address ranges adjacent to the address range containing the trigger address to ensure that pre-fetch is not triggered on subsequent hits to the second translation cache entry.

28. A non-transitory computer-readable medium for pre-fetching address translations in a memory management unit (MMU) of a device, comprising:
   at least one instruction instructing the MMU to detect a triggering condition related to one or more translation caches associated with the MMU, the triggering condition associated with a trigger address;
   at least one instruction instructing the MMU to generate a sequence descriptor describing a sequence of address translations to pre-fetch into the one or more translation caches, wherein the sequence of address translations comprises a plurality of address translations corresponding to a plurality of address ranges adjacent to an address range containing the trigger address;
   at least one instruction instructing the MMU to issue an address translation request to the one or more translation caches for each of the plurality of address translations in the sequence of address translations, wherein the one or more translation caches pre-fetch at least one address translation of the plurality of address translations into the one or more translation caches based on the at least one address translation not being present in the one or more translation caches;
   at least one instruction instructing the MMU to set a pre-fetch flag in a first translation cache entry corresponding to the trigger address to ensure that pre-fetch is performed for an address range corresponding to the first translation cache entry only once; and
   at least one instruction instructing the MMU to set the pre-fetch flag in a second translation cache entry corresponding to at least one of the plurality of address ranges adjacent to the address range containing the trigger address to ensure that pre-fetch is not triggered on subsequent hits to the second translation cache entry.

\* \* \* \* \*